(12) United States Patent
Ouchi et al.

(10) Patent No.: US 9,848,410 B2
(45) Date of Patent: Dec. 19, 2017

(54) DEMODULATION REFERENCE SIGNAL MAPPING ACCORDING TO COMB CONFIGURATION

(71) Applicant: SHARP KABUSHIKI KAISHA, Osaka-shi, Osaka (JP)

(72) Inventors: Wataru Ouchi, Osaka (JP); Shoichi Suzuki, Osaka (JP); Tatsushi Aiba, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/993,668

(22) Filed: Jan. 12, 2016

(65) Prior Publication Data

US 2016/0128052 A1 May 5, 2016

Related U.S. Application Data

(63) Continuation of application No. 14/130,666, filed as application No. PCT/JP2012/066896 on Jul. 2, 2012, now Pat. No. 9,270,437.

(30) Foreign Application Priority Data

Jul. 4, 2011 (JP) .................................. 2011-148043

(51) Int. Cl.
*H04W 72/04* (2009.01)
*H04L 5/00* (2006.01)
(Continued)

(52) U.S. Cl.
CPC ..... *H04W 72/0406* (2013.01); *H04J 11/0053* (2013.01); *H04L 5/0012* (2013.01);
(Continued)

(58) Field of Classification Search
CPC . H04W 72/0406; H04L 27/14; H04L 27/2649
See application file for complete search history.

(56) References Cited

U.S. PATENT DOCUMENTS 8,472,954 B2    6/2013 Nogami et al.
8,483,258 B2 *  7/2013 Cho ................... H04W 72/042
                                              370/229
(Continued)

FOREIGN PATENT DOCUMENTS

JP    2005-328525 A    11/2005
JP    2009-525644 A     7/2009
(Continued)

OTHER PUBLICATIONS

3GPP TS 36.211 V8.6.0 (Mar. 2009), Technical Specification, 3rd Generation Partnership Project; Technical Specification Group Radio Access Network; Evolved Universal Terrestrial Radio Access (E-UTRA); Physical Channels and Modulation (Release 8); 83 pages.

(Continued)

*Primary Examiner* — Warner Wong
(74) *Attorney, Agent, or Firm* — Birch, Stewart, Kolasch & Birch, LLP

(57) ABSTRACT

A communication system comprises at least a base station device and a terminal device. The terminal device transmits a demodulation reference signal associated with a physical channel, receives a configuration of comb of the demodulation reference signal, and transmits the demodulation reference signal mapped based on the configuration of comb. The base station device transmits a configuration of comb of a demodulation reference signal related to a physical channel.

3 Claims, 11 Drawing Sheets

(51) Int. Cl.
*H04J 11/00* (2006.01)
*H04L 27/14* (2006.01)
*H04W 72/00* (2009.01)

(52) U.S. Cl.
CPC .......... *H04L 5/0051* (2013.01); *H04L 5/0053* (2013.01); *H04L 5/0073* (2013.01); *H04L 27/14* (2013.01); *H04W 72/00* (2013.01)

(56) References Cited

U.S. PATENT DOCUMENTS

| | | | |
|---|---|---|---|
| 8,576,784 B2 | 11/2013 | Lohr et al. | |
| 8,634,362 B2 | 1/2014 | Montojo et al. | |
| 8,638,868 B2 | 1/2014 | Larsson et al. | |
| 8,923,905 B2 | 12/2014 | Montojo et al. | |
| 8,989,109 B2* | 3/2015 | Sun | H04L 5/0023 370/252 |
| 2004/0131030 A1* | 7/2004 | Kuroyanagi | H04J 13/00 370/335 |
| 2005/0249164 A1 | 11/2005 | Kwak et al. | |
| 2009/0116434 A1 | 5/2009 | Lohr et al. | |
| 2009/0279493 A1* | 11/2009 | Gaal | H04L 1/1861 370/329 |
| 2010/0246527 A1* | 9/2010 | Montojo | H04L 5/005 370/330 |
| 2010/0260154 A1 | 10/2010 | Frank et al. | |
| 2011/0051749 A1* | 3/2011 | Cheng | H04L 5/0048 370/480 |
| 2011/0077038 A1 | 3/2011 | Montojo et al. | |
| 2011/0081933 A1 | 4/2011 | Suh et al. | |
| 2011/0096810 A1* | 4/2011 | Suehiro | H04B 1/7103 375/130 |
| 2011/0128909 A1* | 6/2011 | Luo | H04L 5/0023 370/328 |
| 2011/0142107 A1* | 6/2011 | Pan | H04B 7/0671 375/219 |
| 2011/0150120 A1* | 6/2011 | Hooli | H04L 5/0023 375/267 |
| 2011/0235597 A1 | 9/2011 | Montojo et al. | |
| 2011/0249648 A1 | 10/2011 | Jen | |
| 2011/0256868 A1 | 10/2011 | Nogami et al. | |
| 2011/0317596 A1* | 12/2011 | Jongren | H04L 5/0053 370/280 |
| 2012/0020421 A1 | 1/2012 | Larsson et al. | |
| 2012/0039158 A1* | 2/2012 | Cheng | H04B 7/0671 370/203 |
| 2012/0163335 A1* | 6/2012 | Chung | H04L 5/0023 370/330 |
| 2012/0207119 A1* | 8/2012 | Zhang | H04L 5/0023 370/329 |
| 2013/0083709 A1 | 4/2013 | Ahn et al. | |
| 2013/0128860 A1* | 5/2013 | Zhang | H04L 5/0053 370/330 |
| 2013/0142150 A1* | 6/2013 | Zhou | H04L 5/0048 370/329 |
| 2013/0188535 A1 | 7/2013 | Seo et al. | |
| 2013/0250863 A1 | 9/2013 | Nogami et al. | |
| 2014/0112286 A1 | 4/2014 | Ahn et al. | |
| 2014/0204854 A1* | 7/2014 | Freda | H04L 1/18 370/329 |
| 2015/0249526 A1* | 9/2015 | Kim | H04L 5/0048 370/329 |
| 2016/0057757 A1* | 2/2016 | Papasakellariou | H04W 72/0413 370/335 |

FOREIGN PATENT DOCUMENTS

| | | |
|---|---|---|
| JP | 2013-507061 A | 2/2013 |
| WO | WO 2010/073468 A1 | 1/2010 |
| WO | WO 2011/041552 A1 | 4/2011 |

OTHER PUBLICATIONS

Draft 3GPP TS 36.211 Va.2.0 (Jun. 2011) Technical Specification, 3rd Generation Partnership Project; Technical Specification Group Radio Access Network; Evolved Universal Terrestrial Radio Access (E-UTRA); Physical Channels and Modulation (Release 10), 103 pages.
Ericsson, St-Ericsson, "On Simulations Assumptions for Phase 2 CoMP Evaluations", 3GPP TSG-RAN WG1 #64, R1-110650, Taipei, Taiwan, Feb. 21-Feb. 25, 2011, 5 pages.
Panasonic, "Comparison of Orthogonal/Non-orthogonal CoMP Transmission for PUCCH", 3GPP TSG RAN WG1 Meeting #58, Shenzhen, China, Aug. 24-28, 2009, R1-093460, 5 pages.
Sharp, "UL-CoMP Rel-11 Proposed Enhancements", 3GPP TSG RAN WG1 Meeting #65, R1-111477, Barcelona, Spain, May 9-13, 2011, 4 pages.
Corrected Notice of Allowance in U.S. Appl. No. 14/130,666 dated Dec. 15, 2015.
Notice of Allowance in U.S. Appl. No. 14/130,666 dated Oct. 13, 2015.
U.S. Office Action in U.S. Appl. No. 14/130,666 dated Jun. 3, 2015.

\* cited by examiner

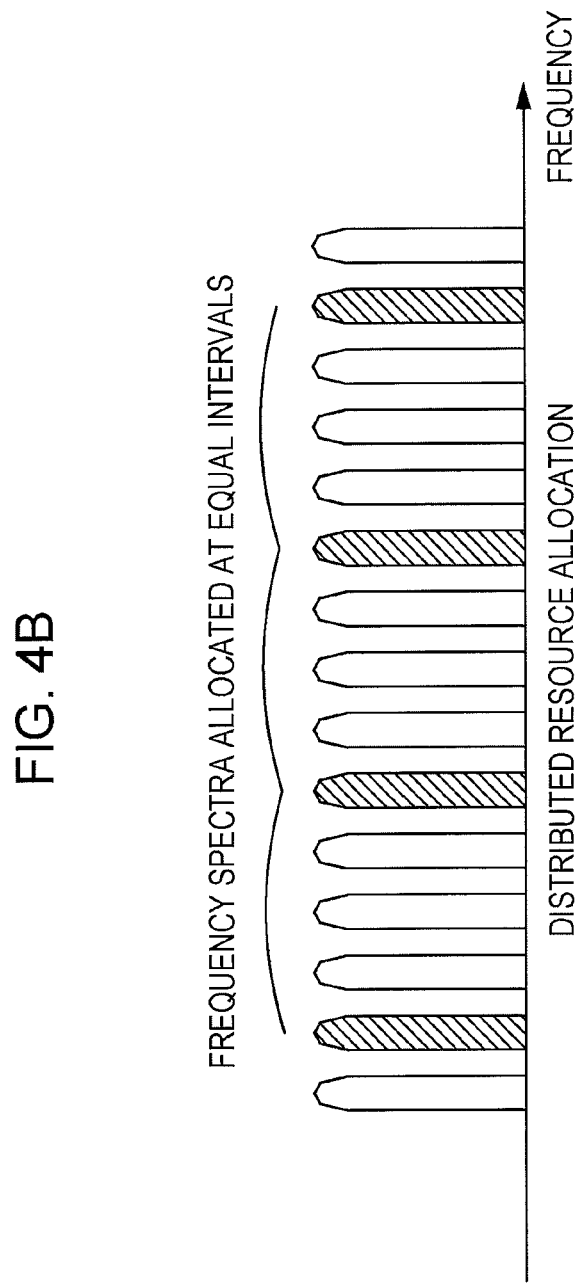

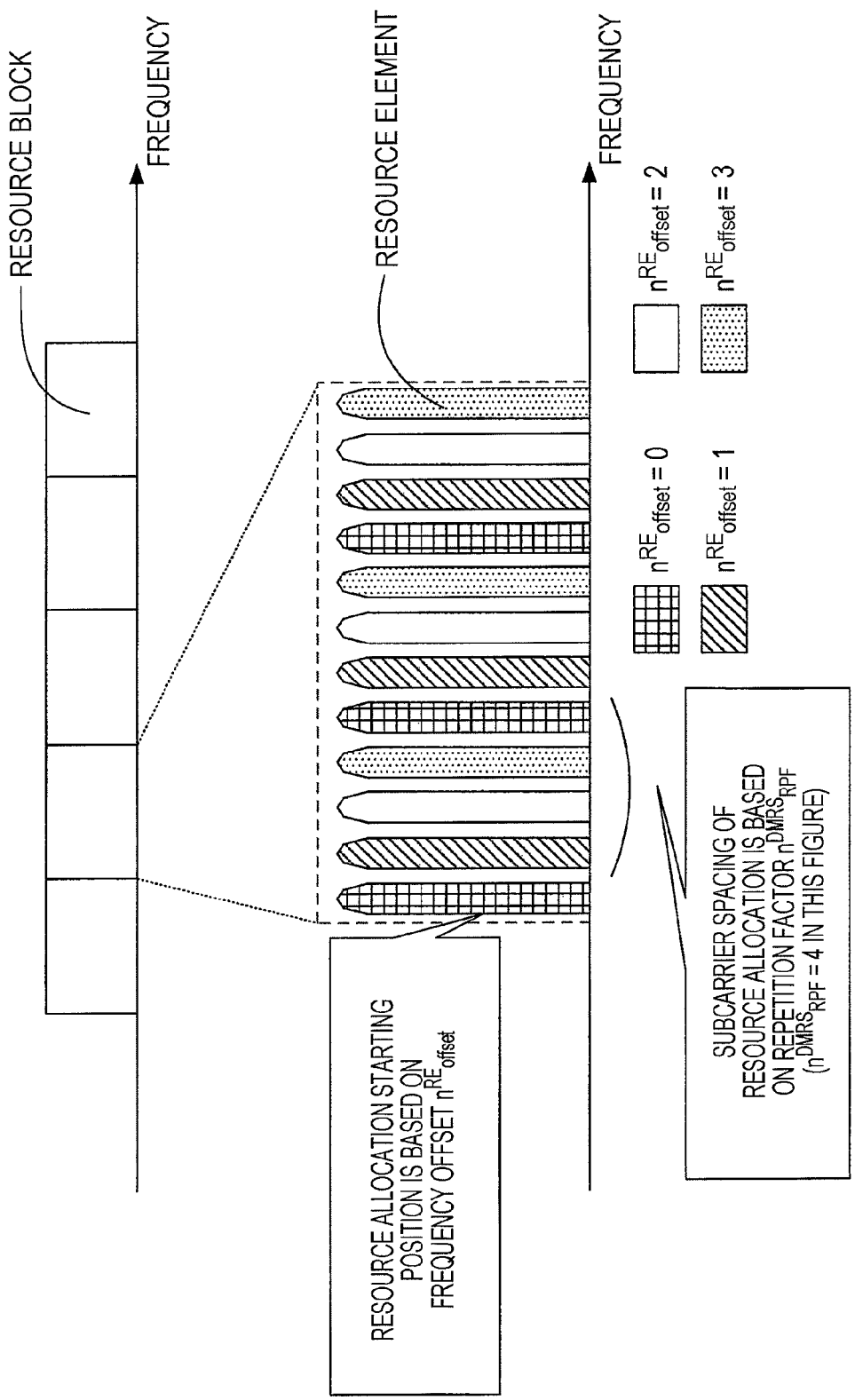

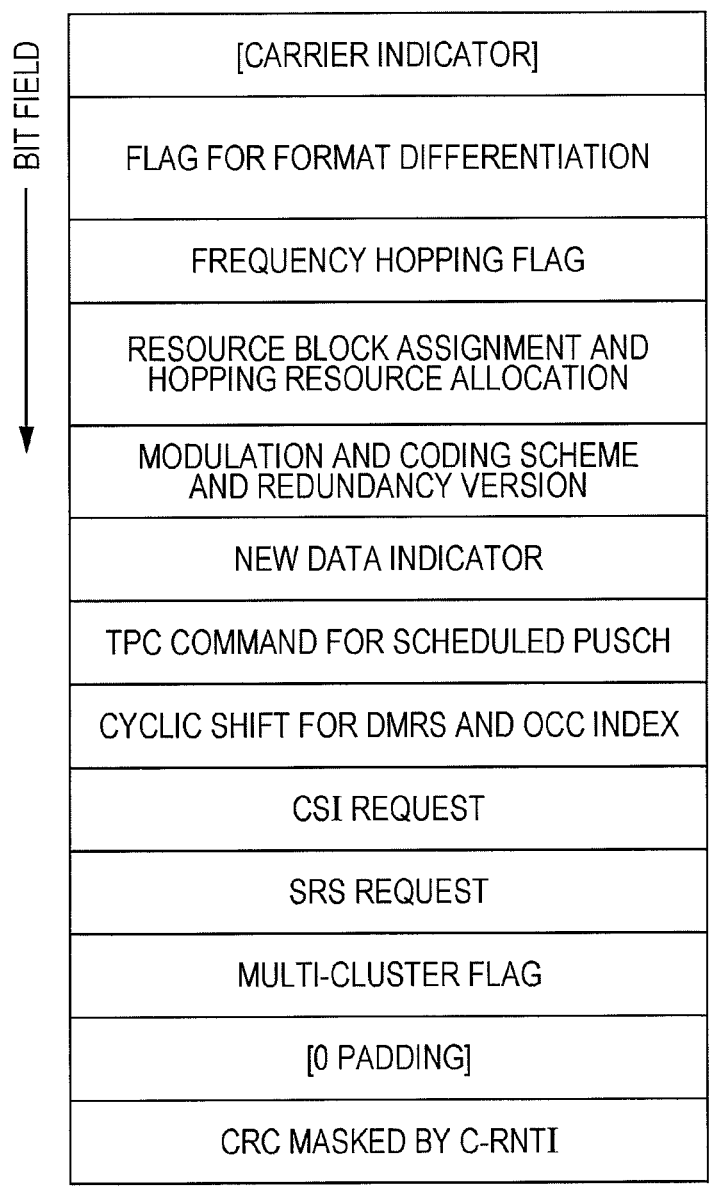

COMB HOPPING IS DISABLED

COMB HOPPING IS ENABLED

DEMODULATION REFERENCE SIGNAL MAPPING ACCORDING TO COMB CONFIGURATION

RELATED APPLICATION

This application is a Continuation of copending application Ser. No. 14/130,666 filed on Jan. 2, 2014, which is the National Phase of PCT/JP2012/066896 filed Jul. 2, 2012, and which claims priority to Application No. 2011-148043 filed in Japan on Jul. 4, 2011. The entire contents of all of the above applications is hereby incorporated by reference.

TECHNICAL FIELD

The present invention relates to a communication system, a base station apparatus, a mobile station apparatus and a communication method.

BACKGROUND ART

3GPP (3rd Generation Partnership Project) is a project that is intended to study and formulate specifications of a mobile communication system based on a network that is upgraded from W-CDMA (Wideband-Code Division Multiple Access) and GSM (registered trademark) (Global System for Mobile Communications). Currently being studied under 3GPP, with the advance of the third-generation radio access technology (hereinafter referred to as "LTE (Long Term Evolution)" or "EUTRA (Evolved Universal Terrestrial Radio Access)" and the use of a wider frequency bandwidth, is a mobile communication system (hereinafter referred to as "LTE-A (Long Term Evolution-Advanced)" or "Advanced-EUTRA") that permits even higher data transmission and reception.

As a communication scheme in LTE, 3GPP is studying, for a downlink, OFDMA (Orthogonal Frequency Division Multiple Access) that performs user-multiplexing using mutually orthogonal subcarriers and SC-FDMA (Single Carrier-Frequency Division Multiple Access) for an uplink.

As a communication scheme in LTE-A, 3GPP is studying OFDMA for the downlink and for the uplink, an introduction of Clustered-SC-FDMA (Clustered-Single Carrier-Frequency Division Multiple Access, also referred to as DFT-s-OFDM with Spectrum Division Control or DFT-precoded OFDM) in addition to SC-FDMA.

In a radio communication system, a communication area may be expanded by introducing a cellular structure to arrange in a cell-like fashion a plurality of coverage areas covered by base station apparatus. Although even a mobile station apparatus in a cell edge (cell end) region communicates without being interfered by using different frequencies between adjacent cells (sectors), frequency usage efficiency is problematic. In LTE, the frequency usage efficiency is substantially increased by using the same frequency repeatedly in each of the cells (sectors). However, a mobile station apparatus in the cell edge region is likely to be affected by interference from an adjacent cell, and communication quality is degraded. This entails reducing or suppressing interference to the mobile station apparatus in the cell edge region.

Currently being studied in LTE-A as a method of reducing or suppressing interference to the mobile station apparatus in the cell edge region is a Coordinated Multi-Point Transmission/Reception (COMP) that performs interference coordination to cause adjacent cells (adjacent transmission and reception points) to coordinate each other. The word point herein refers to a transmission point (transmission station apparatus) of a signal and a reception point (reception station apparatus) of a signal. For example, the point may be a base station apparatus. Also, the point may be a mobile station apparatus. Also, the point may be a relay station apparatus. The point may be RRH (Remote Radio Head) as an upgraded antenna facility.

In coordinated communications, orthogonal resources alone of a uplink demodulation reference signal (DMRS: Demodulation Reference Signal) of LTE are insufficient to ensure orthogonality between the cells (transmission and reception points). Currently being studied is an increase in the orthogonal resources of DMRS that may be achieved by changing the frequency resource allocation of DMRS in a frequency spectrum from localized resource allocation to distributed resource allocation (for example, comb spectrum arrangement at two-subcarrier intervals such as a sounding reference signal (SRS: Sounding Reference Signal) (Non Patent Literature 1).

Disclosed further in the coordinated communications are a scenario where cell IDs (physical layer cell identities) different among a plurality of points are set, and a scenario where a common cell ID is set (Non Patent Literature 2).

CITATION LIST

Non Patent Literature

NPL 1: "UL-CoMP Rel-11 Proposed Enhancements", 3GPP TSG RAN WG1 Meeting #65, R1-111477, May 9-13, 2011.
NPL 2: "On Simulations Assumptions for Phase 2 CoMP Evaluations," 3GPP TSG RAN WG1 Meeting #64, R1-110650, Feb. 21-25, 2011.

SUMMARY OF INVENTION

Technical Problem

However, since interference coordination is not performed between uncoordinated adjacent cells (points), it is difficult to avoid interference between the uncoordinated adjacent cells (points).

The present invention has been developed in view of the above problem. It is an object of the present invention to provide a communication system, a base station apparatus, a mobile station apparatus, and a communication method for reducing interference between uncoordinated adjacent cells.

Solution to Problem (1) To achieve the object, the present invention comprises a communication system as described below. The communication system comprises a base station apparatus and a mobile station apparatus. The base station apparatus notifies the mobile station apparatus of a downlink control information format. The downlink control information format comprises resource allocation information that indicates switching of resource allocation for an uplink demodulation reference signal between localized resource allocation and distributed resource allocation, and information on a frequency offset of the distributed resource allocation for the uplink demodulation reference signal specific to the mobile station apparatus. The mobile station apparatus determines the resource allocation for the uplink demodulation reference signal based on the frequency offset of the mobile station apparatus in a case in which information included in the downlink control information format indicates that the distributed resource allocation is enabled based on the resource allocation information in accordance with a certain information comprised in the downlink control information format, and transmits the uplink demodulation reference signal to the base station apparatus.

(2) In the communication system of the present invention in view of the communication system (1), the base station apparatus notifies the mobile station apparatus of the downlink control information format comprising information indicating a availability of frequency offset hopping of the distributed resource allocation for the uplink demodulation reference signal. The mobile station apparatus determines the resource allocation for the uplink demodulation reference signal based on a frequency offset hopping pattern specific to a cell determined in response to a slot number and the frequency offset specific to the mobile station apparatus, in a case in which information comprised in the downlink control information format indicates that the distributed resource allocation is enabled based on the resource allocation information and indicates that the frequency offset hopping of the distributed resource allocation is enabled.

(3) In the communication system of the present invention in view of the communication system (2), the frequency offset hopping pattern specific to the cell is configured based on a pseudo-random sequence corresponding to the slot number.

(4) In the communication system of the present invention in view of the communication system (3), an initial value of the pseudo-random sequence is configured on the basis of a physical layer cell identity.

(5) In the communication system of the present invention in view of the communication system (3), the initial value of the pseudo-random sequence is configured on the basis of a virtual cell identity.

(6) A communication system of the present invention comprises a base station apparatus and a mobile station apparatus. The base station apparatus notifies the mobile station apparatus of a downlink control information format. The downlink control information format comprises resource allocation information for an uplink demodulation reference signal, a frequency offset for the uplink demodulation reference signal specific to the mobile station apparatus, and a frequency offset shift pattern for the uplink demodulation reference signal specific to a cell. The mobile station apparatus determines resource allocation for the uplink demodulation reference signal using the frequency offset specific to the mobile station apparatus, the frequency offset shift pattern specific to the cell, and a slot number, in a case in which information comprised in the downlink control information format indicates distributed resource allocation is enabled based on the resource allocation information. The mobile station apparatus then transmits the uplink demodulation reference signal to the base station apparatus.

(7) In the communication system of the present invention in view of the communication system (6), the frequency offset shift pattern specific to the cell is configured on the basis of a physical layer cell identity.

(8) In the communication system of the present invention in view of the communication system (6), the frequency offset shift pattern specific to the cell is configured on the basis of a virtual cell identity.

(9) A base station apparatus of the present invention is in communication with a mobile station apparatus. The base station apparatus comprises a transmitter configured to notify the mobile station apparatus of a downlink control information format, the downlink control information format comprising resource allocation information that indicates switching of resource allocation of an uplink demodulation reference signal between localized resource allocation and distributed resource allocation, and a frequency offset of the distributed resource allocation of the uplink demodulation reference signal specific to the mobile station apparatus, and a receiver configured to receive the uplink demodulation reference signal based on the resource allocation indicated by the resource allocation information.

(10) The base station apparatus of the present invention is in view of the base station apparatus (9), wherein the receiver is configured to notify the mobile station apparatus of the downlink control information format that comprises information indicating a availability of frequency offset hopping of the distributed resource allocation for the uplink demodulation reference signal.

(11) A base station apparatus of the present invention is in communication with a mobile station apparatus. The base station apparatus comprises a transmitter configured to notify the mobile station apparatus of a downlink control information format, the downlink control information format comprising resource allocation information for an uplink demodulation reference signal, a frequency offset for the uplink demodulation reference signal specific to the mobile station apparatus, and a frequency offset shift pattern for the uplink demodulation reference signal specific to a cell.

(12) A mobile station apparatus of the present invention is in communication with a base station apparatus. The mobile station comprises a receiver configured to receive a downlink control information format, means that determines resource allocation of an uplink demodulation reference signal in accordance with a frequency offset specific to the mobile station apparatus, in a case in which information comprised in the downlink control information format dictates distributed resource allocation in resource allocation information for the uplink demodulation reference signal, and a transmitter configured to transmit the uplink demodulation reference signal to the base station apparatus.

(13) The mobile station apparatus of the present invention is in view of the mobile station (12), wherein the transmitter is configured to determine the resource allocation for the uplink demodulation reference signal on the basis of a frequency offset hopping pattern specific to a cell determined in response to a slot number and the frequency offset for the uplink demodulation reference signal specific to the mobile station apparatus, in a case in which information, comprised in the downlink control information format and concerning a availability of frequency offset hopping of the distributed resource allocation for the uplink demodulation reference signal, indicates that the frequency offset hopping is enabled.

(14) A mobile station apparatus of the present invention is in communication with a base station apparatus. The mobile station apparatus comprises a receiver configured to receive a downlink control information format, and a transmitter configured to determine resource allocation for an uplink demodulation reference signal using a frequency offset specific to the mobile station apparatus, a frequency offset shift pattern specific to a cell, and a slot number, in a case in which information comprised in the downlink control information format indicates that the distributed resource allocation is enabled based on resource allocation information.

(15) A communication method of the present invention of a communication system comprising a base station apparatus and a mobile station apparatus, comprises at least, a step of the base station apparatus of notifying the mobile station apparatus of a downlink control information format, the downlink control information format comprising resource allocation information that dictates switching of resource allocation for an uplink demodulation reference signal between localized resource allocation and distributed resource allocation, and a frequency offset of the distributed resource allocation for the uplink demodulation reference signal specific to the mobile station apparatus, and a step of the mobile station apparatus of determining the resource allocation for the uplink demodulation reference signal on the basis of the frequency offset of the mobile station apparatus in a case in which information comprised in the downlink control information format indicates that the distributed resource allocation is enabled based on the resource allocation information, and a step of the mobile station apparatus of transmitting the uplink demodulation reference signal to the base station apparatus.

(16) The communication method of the present invention in view of the communication method (15), comprises at least, a step of the base station apparatus of notifying the mobile station apparatus of the downlink control information format comprising information indicating a availability of frequency offset hopping of the distributed resource allocation for the uplink demodulation reference signal, and a step of the mobile station apparatus of determining the resource allocation for the uplink demodulation reference signal using a frequency offset hopping pattern specific to a cell determined in response to a slot number and a frequency offset specific to the mobile station apparatus, in a case in which the information comprised in the downlink control information format indicates that the distributed resource allocation is enabled based on the resource allocation information and indicates that the frequency offset hopping of the distributed resource allocation is enabled.

(17) A communication method of the present invention of a communication system comprising a base station apparatus and a mobile station apparatus, comprises at least, a step of the base station apparatus of notifying the mobile station apparatus of a downlink control information format, the downlink control information format comprising resource allocation information for an uplink demodulation reference signal, a frequency offset for the uplink demodulation reference signal specific to the mobile station apparatus, and a frequency offset shift pattern for the uplink demodulation reference signal specific to a cell, and a step of the mobile station apparatus of determining the resource allocation for the uplink demodulation reference signal using the frequency offset specific to the mobile station apparatus, the frequency offset shift pattern specific to the cell, and a slot number in a case in which information comprised in the downlink control information format indicates that distributed resource allocation is enabled based on the resource allocation information, and a step of the mobile station apparatus of transmitting the uplink demodulation reference signal to the base station apparatus.

The communication system, the base station apparatus, the mobile station apparatus and the communication method thus reduce interference between uncoordinated adjacent cells (points).

Advantageous Effects of Invention

According to the present invention, interference between adjacent cells is reduced.

BRIEF DESCRIPTION OF DRAWINGS

FIG. 4B illustrates a configuration example of the DMRS resource allocation of the first embodiment of the present invention.

FIG. 5 illustrates an example of DMRS distributed resource allocation of the first embodiment of the present invention.

FIG. 7A illustrates a configuration example of a control information field comprised in a DCI format.

DESCRIPTION OF EMBODIMENTS

Figure 1:
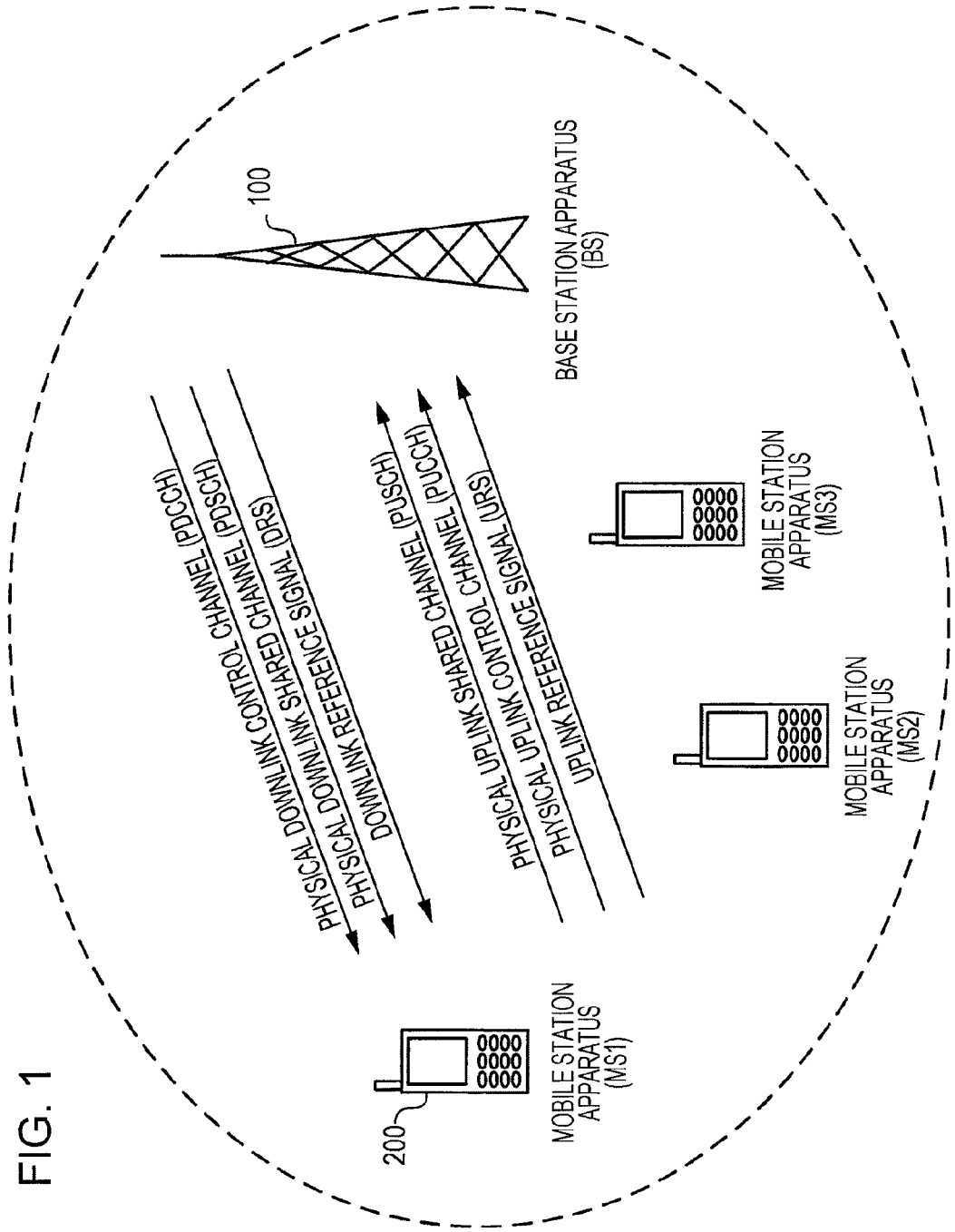
FIG. 1 illustrates a configuration example of a channel in an embodiment of the present invention.

Embodiments of the present invention are described with reference to the drawings. FIG. 1 illustrates a configuration example of a channel in an embodiment of the present invention. Physical downlink channels are a physical downlink control channel (PDCCH) and a physical downlink shared channel (PDSCH). Physical uplink channels are a physical uplink shared channel (PUSCH) and a physical uplink control channel (PUCCH).

A base station apparatus 100 transmits to a mobile station apparatus 200 a downlink reference signal (DRS, also referred to as a downlink pilot signal or a downlink pilot channel). The mobile station apparatus 200 transmits to the base station apparatus 100 an uplink reference signal (URS, also referred to as an uplink pilot signal or an uplink pilot channel). Two types of the uplink reference signals are supported. One type is a demodulation reference signal (DMRS) that the base station apparatus 100 uses to perform demodulation of data/information transmitted using PUCCH and/or PUSCH. Another type is a sounding reference signal (SRS) that the base station apparatus 100 uses to estimate a channel state of an uplink.

The PDCCH is a physical channel that is used to notify the mobile station apparatus of downlink control information (DCI) (to specify the DCI to the mobile station). The DCIs are information on resource allocation for the PDSCH, information on HARQ process related to downlink data, and information on resource allocation for the PUSCH and the like. The PDCCH is transmitted on an aggregation of one or more control channel elements (CCE). By detecting the PDCCH comprising the one or more CCEs, the mobile station apparatus 200 performs reception of scheduling assignments and other control information transmitted using the PDCCH from the base station apparatus 100. The base station apparatus 100 maps the CCE to a plurality of resource element groups (REG, also referred to as mini-CCE) that are distributed in terms of frequency and time domain. The resource element herein refers to a unit resource having one OFDM symbol (time domain) and one subcarrier (frequency domain).

A plurality of formats is defined in accordance with the downlink control information transmitted in PDCCH. The format of the downlink control information is hereinafter also referred to as a DCI format.

DCI formats 1/1A/2 are defined as the DCI formats for the downlink. The DCI formats 1/1A are used to perform transmission in the PDSCH in transmit diversity using one or more transmit antenna ports. Also the DCI format 2 is used to perform transmission in the PDSCH using spatial multiplexing (SM) based on multiple input multiple output (MIMO). As the DCI format, a plurality of DCI formats having the same bit size or a plurality of DCI formats having different bit sizes may be defined. There are a plurality of the DCI formats consisting of the same bit size and/or different bit size.

DCI format 0 and DCI format 4 are defined as the DCI formats for the uplink. The DCI format 0 is used to schedule transmission in the PUSCH on a single transmit port. The DCI format 4 is used to schedule transmission in the PUSCH using the SM based on the MIMO.

The base station apparatus 100 scrambles a CRC (cyclic redundancy check) code by a RNTI (Radio Network Temporary Identifier) with a DCI format and transmits one or more DCIS in the PDCCH with the DCI format and with the CRC to the mobile station apparatus 200. The mobile station apparatus 200 changes an interpretation of the DCI transmitted using the DCI format on the basis of which RNTI the cyclic redundancy check code is scrambled. For example, if the cyclic redundancy check code is scrambled by C-RNTI (Cell-Radio Network Temporary Identifier) that is assigned by the base station apparatus 100, the mobile station apparatus 200 determines that that the DCI has been addressed to the mobile station apparatus 200.

The PDCCH is coded on a per DCI format basis. In other words, the mobile station apparatus 200 detects a plurality of PDCCHs, thereby acquiring information on a resource allocation for the downlink, information on a resource allocation for the uplink, and other control information. Each PDCCH is accompanied by a value of CRC (cyclic redundancy check) that permits the format of the PDCCH to be identified, and the mobile station apparatus 200 performs the CRC on each set of CCE that may form the PDCCH. The mobile station apparatus 200 acquires a successfully CRC-checked PDCCH as a PDCCH addressed thereto. This is also referred to as blind decoding. A space of the set of CCE that may form the PDCCH on which the mobile station apparatus 200 performs blind decoding is referred to as a search area (Search Space). More specifically, the mobile station apparatus 200 performs blinding decoding on the CCE within the search space, and detects a PDCCH addressed thereto.

If the resource allocation for the PDSCH is transmitted using the PDCCH to the mobile station apparatus 200, the mobile station apparatus 200 receives at least one of the downlink signals (downlink data (transport block for downlink shared channel (DL-SCH)) and downlink control data (downlink control information) and a downlink reference signal (DRS)) on the basis of the PDSCH in response to the resource allocation indicated by the PDCCH from the base station apparatus 100. More specifically, the PDCCH comprising the resource allocation of the PDSCH may also be referred to as a signal for assigning a resource to the downlink (hereinafter referred to as a "downlink transmission permit signal" or "downlink grant").

If the resource allocation for the PUSCH is transmitted using the PDCCH to the mobile station apparatus 200, the mobile station apparatus 200 transmits at least one of the uplink signals (uplink data (transport block for uplink shared channel (UL-SCH)), uplink control data (uplink control information) and an uplink reference signal (URS)) on the PUSCH region corresponding to information on the resource allocation transmitted using the PDCCH from the base station apparatus 100. More specifically, the PDCCH may also be referred to as a signal for permitting data transmission in the uplink (hereinafter referred to as a "uplink transmission permit signal" or "uplink grant").

The PDSCH is a physical channel that is used to transmit the downlink data (transport block for the downlink shared channel (DL-SCH)) or paging information (transport block for a paging channel (PCH)). Using the PDSCH assigned by the PDCCH, the base station apparatus 100 transmits the downlink data (transport block for the downlink shared channel (DL-SCH)) to the mobile station apparatus 200.

The downlink data refers to user data, for example, and DL-SCH is a transport channel. DL-SCH is characterized by support for HARQ, support for dynamic link adaptation, possibility to use beamforming and support for both dynamic and semi-static resource allocation etc.

The PUSCH is a physical channel that is used to mainly transmit the uplink data (transport block for the uplink shared channel (UL-SCH)). Using the PUSCH assigned by the PDCCH transmitted from the base station apparatus 100, the mobile station apparatus 200 transmits to the base station apparatus 100 the uplink data (transport block for the uplink shared channel (UL-SCH)). If the base station apparatus 100 has performed a PUSCH scheduling operation on the mobile station apparatus 200, the mobile station apparatus 200 also transmits the uplink control signal (UCI) using the PUSCH.

The uplink data refers to user data, for example, and UL-SCH is a transport channel. The PUSCH is a physical channel that is defined (constructed) by the time domain and the frequency domain. UL-SCH is characterized by possibility to use beamforming, support for dynamic link adaptation, support for HARQ and support for both dynamic and semi-static resource allocation.

The uplink data (UL-SCH) and the downlink data (DL-SCH) may comprise a radio resource control signal (hereinafter referred to as "RRC") that is one of the signals from a higher layer to be exchanged between the base station apparatus 100 and the mobile station apparatus 200. The uplink data (UL-SCH) and the downlink data (DL-SCH) may comprise an MAC (Medium Access Control) control element to be exchanged between the base station apparatus 100 and the mobile station apparatus 200.

The base station apparatus 100 and the mobile station apparatus 200 transmit and receive RRC signaling by a higher layer (Radio Resource Control Layer). The base station apparatus 100 and the mobile station apparatus 200 also transmit and receive the MAC control element by a higher layer (MAC (Medium Access Control) layer).

The PUCCH is a channel that is used to transmit uplink control information (UCI). The uplink control information comprises channel state information (CSI), channel quality information (CQI), precoding matrix indicator (PMI), and rank indicator (RI). The uplink control information further comprises information indicating ACK/NACK in the HARQ for the downlink transport block. The uplink control information further comprises a scheduling request by which the mobile station apparatus 200 requests the resource allocation to transmit the uplink data (requests transmission in the UL-SCH).

In a case in which an initial access is performed, the mobile station apparatus 200 may estimate a Physical-layer Cell Identity (PCI) using a physical-layer identity group and a physical-layer cell identity, obtained from a Primary Synchronization Signal (PSS) for use in time synchronization, and a Secondary Synchronization Signal (SSS) for use in cell synchronization and frame timing synchronization. If a connection is established between the base station apparatus 100 and the mobile station apparatus 200, the base station apparatus 100 may notify the mobile station apparatus 200 of the physical-layer cell identity using RRC signaling. The RRC signaling may also be referred to as higher layer signaling.

In LTE/LTE-A, a signal sequence is assigned to each physical channel to reduce intra-cell/inter-cell interference. If mobile station apparatuses belonging to different cells remain in the same signal sequence (between slots), a transmission signal from the mobile station apparatus 200 belonging to an adjacent cell becomes interference to the base station apparatus 100. To prevent the signal sequence from continuously remaining the same from slot to slot between the mobile station apparatuses (having physical layer cell identities different from cell to cell), Sequence Group Hopping (SGH) and Sequence Hopping (SH) are used so that inter-cell interference is randomized. The inter-cell interference is randomized by configuring the initial value of a signal sequence generator on the basis of a physical layer cell identity.

The inter-cell interference is further randomized by using cyclic hopping that applies a cyclic shift different from slot to slot.

For DMRS, a reference signal sequence is generated using an orthogonal cover code (OCC). In accordance with the present invention, the orthogonal cover codes $[w^{(\lambda)}(0), w^{(\lambda)}(1)]$ comprise two codes [+1, +1] and [+1, −1]. The mobile station apparatus 200 performs a spread process using an orthogonal cover code for two DMRS symbols with respect to the PUSCH assigned to one subframe, thereby generating an uplink reference signal sequence. If the PUSCH and the DMRS resource for the PUSCH are transmitted on the same frequency domain from different mobile station apparatus 200, the base station apparatus 100 may perform a channel estimation for the DMRS transmitted from the different mobile station apparatuses 200 by performing a despread process on the orthogonal cover code from the received DMRS symbol. If the DMRSs having different sequence lengths (different bandwidths) overlap each other, the spread process by the orthogonal cover code is performed on the two DMRS symbols for the PUSCH. The mobile station apparatus 200 thus demultiplexes the plurality of DMRSs transmitted from the different mobile station apparatuses 200. Even if DMRSs different in sequence length are multiplexed at the same timing and in the same transmission frequency band, orthogonality is ensured. Here, $\lambda$ represents a transmit port.

In the DMRS and the PUCCH, the cyclic shift (phase shift amount that is to be multiplied by each subcarrier) is determined on a per slot basis and on a per symbol basis using a pseudo-random sequence. An amount of cyclic shift is randomized by changing the cyclic shift amount in a random fashion. This arrangement controls cyclic shifting so that the same cyclic shift is not continuously set in the different mobile station apparatuses (this is herein called cyclic shift hopping). More specifically, in the cyclic shift hopping, interference between the mobile station apparatuses belonging to the different cells is reduced by randomizing the cyclic shifts in the mobile station apparatuses belonging to the different cells.

In the SRS, the distributed resource allocation of comb spectra is introduced. In this way, the channel estimation of the same transmission frequency band is performed on the mobile station apparatus 200 having a difference transmission bandwidth (different consequence length). More specifically, the base station apparatus 100 performs to the mobile station apparatus 200 not only code multiplexing by the same bandwidth and the same time but also frequency multiplexing by different frequency offsets.

[Configuration of Base Station Apparatus 100]

Figure 2:
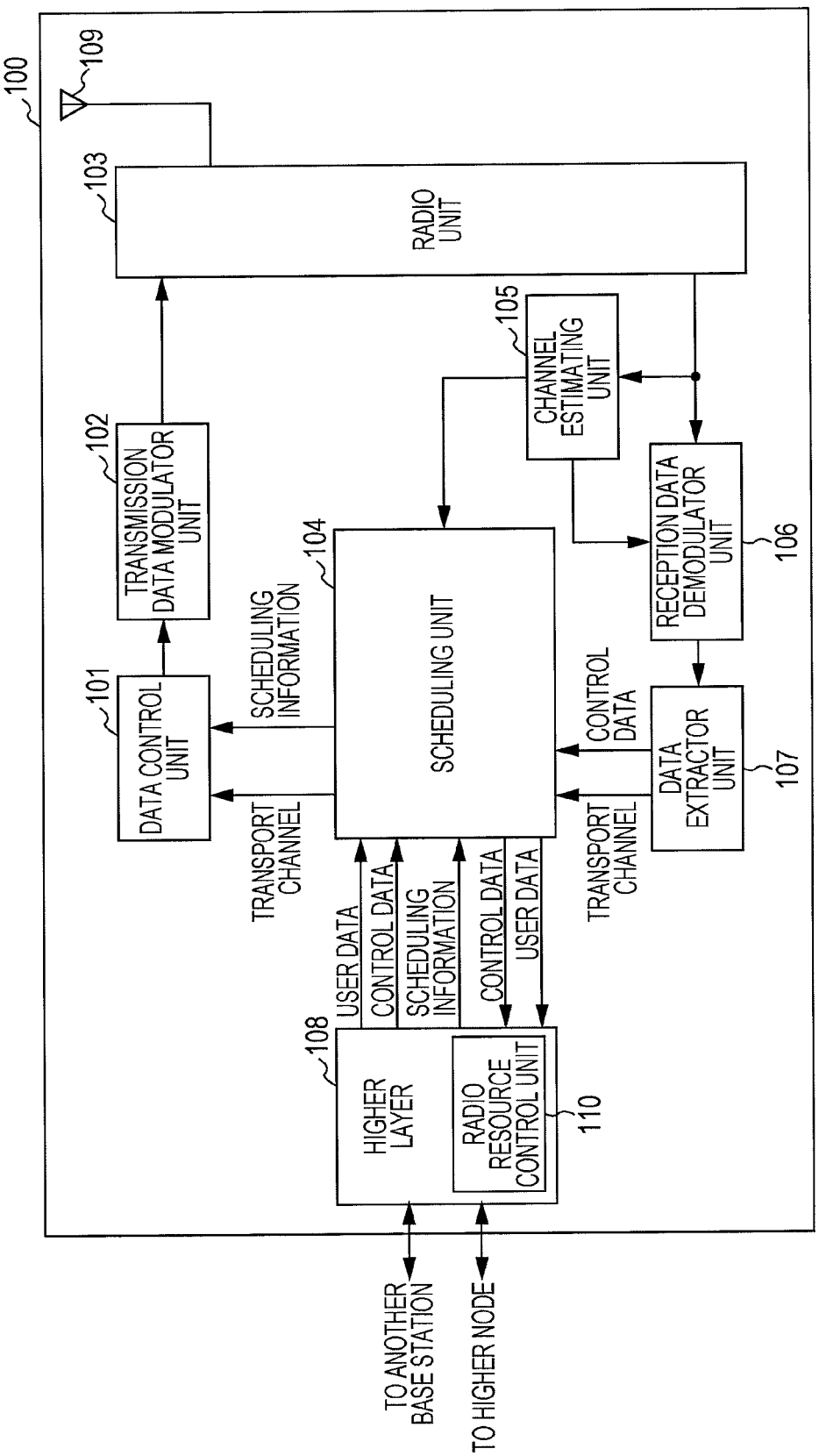
FIG. 2 is a block diagram schematically illustrating a configuration of a base station apparatus 100 of the embodiment of the present invention.

FIG. 2 is a block diagram schematically illustrating a configuration of the base station apparatus 100 of the embodiment of the present invention. The base station apparatus 100 comprises a data control unit 101, a transmission data modulator unit 102, a radio unit 103, a scheduling unit 104, a channel estimating unit 105, a reception data demodulator unit 106, a data extractor unit 107, a higher layer 108 and an antenna 109. The radio unit 103, the scheduling unit 104, the channel estimating unit 105, the reception data demodulator unit 106, the data extractor unit 107, the higher layer 108 and the antenna 109 form a receiver (a base station receiver), and the data control unit 101, the transmission data modulator unit 102, the radio unit 103, the scheduling unit 104, the higher layer 108 and the antenna 109 form a transmitter (a base station transmitter).

Processing of an uplink physical layer is performed by the antenna 109, the radio unit 103, the channel estimating unit 105, the reception data demodulator unit 106 and the data extractor unit 107. Processing of a downlink physical layer is performed by the antenna 109, the radio unit 103, the transmission data modulator unit 102 and the data control unit 101.

The data control unit 101 receives a transport channel from the scheduling unit 104. The data control unit 101 maps the transport channel and a signal and a channel generated at a physical layer to the physical channel in accordance with scheduling information input from the scheduling unit 104. Data thus mapped is output to the transmission data modulator unit 102.

The transmission data modulator unit 102 modulates transmission data in accordance with an OFMD scheme. In accordance with the scheduling information from the scheduling unit 104 and a modulation scheme and a coding scheme corresponding to each PRB, the transmission data modulator unit 102 performs signal processes on the data input from the data control unit 101. The signal processes comprise data modulation, encoding, serial/parallel conversion of an input signal, IFFT (Inverse Fast Fourier Transform) operation, CP (Cyclic Prefix) insertion, and filtering. The transmission data modulator unit 102 thus generates transmission data and outputs the generated transmission data to the radio unit 103. The scheduling information comprises assignment information on a downlink physical resource block (PRB: Physical Resource Block), such as physical resource block location information of frequency and time. The modulation scheme and the coding scheme corresponding to each PRB may comprise information, such as modulation scheme: 16 QAM, and encoding ratio: 2/3 encoding rate.

The radio unit 103 up-converts modulation data input from the transmission data modulator unit 102 into a radio signal, and then transmits the up-radio signal to the mobile station apparatus 200 via the antenna 109. The radio unit 103 also receives an uplink radio signal from the mobile station apparatus 200 via the antenna 109, and down-converts the received signal into a baseband signal, and then outputs the baseband signal to the channel estimating unit 105 and the reception data demodulator unit 106.

The scheduling unit 104 performs a process in a medium access control (MAC) layer. The scheduling unit 104 performs mapping in a logical channel and a transport channel, and scheduling in the downlink and the uplink (comprising HARQ process, selection of a transport format, and the like). In order to control processors of the physical layer in an integral fashion, the scheduling unit 104 comprises an interface (not illustrated) between the scheduling unit 104 and each of the antenna 109, the radio unit 103, the channel estimating unit 105, the reception data demodulator unit 106, the data control unit 101, the transmission data modulator unit 102 and the data extractor unit 107.

In accordance with uplink signals (CSI, CQI, PMI, RI, information representing ACK/NACK with respect to a downlink transport block, a scheduling request, a reference signal, and the like) received from the mobile station apparatus 200, information of the PRB usable on each mobile station apparatus 200, buffer status, scheduling information input from the higher layer 108, and the like, the scheduling unit 104 generates scheduling information during the downlink scheduling for use in a selection process of the downlink transport format (a transmission form, such as assignment of the physical resource block, the modulation scheme, and the encoding scheme) for modulating each piece of data, and for use in retransmission control in HARQ and downlink. The scheduling information for use in the downlink scheduling is output to the data control unit 101.

In accordance with estimation results of a channel state of the uplink output from the channel estimating unit 105 (radio channel state), a resource assignment request from the mobile station apparatus 200, information of the PRB usable on each mobile station apparatus 200, scheduling information input from the higher layer 108, and the like, the scheduling unit 104 generates scheduling information during the uplink scheduling for use in a selection process of the uplink transport format (a transmission form, such as assignment of the physical resource block, the modulation scheme, and the encoding scheme) for modulating each piece of data, and for use in uplink scheduling. The scheduling information for use in the uplink scheduling is output to the data control unit 101.

The scheduling unit 104 maps the logical channel of the downlink input from the higher layer 108 to the transport channel, and then outputs the resulting logical channel to the data control unit 101. Upon processing control data acquired in the uplink and input from the data extractor unit 107 and the transport channel as appropriate, the scheduling unit 104 maps the resulting data to the logical channel of the uplink and then outputs the mapping result to the higher layer 108.

In order to demodulate the uplink data, the channel estimating unit 105 estimates the channel state of the uplink from a demodulation reference signal (DRS), and outputs the estimation result to the reception data demodulator unit 106. In order to schedule the uplink, the channel estimating unit 105 estimates the channel state of the uplink from the sounding reference signal (SRS), and outputs the estimation result to the scheduling unit 104.

The reception data demodulator unit 106 also serves as an OFDM demodulator unit and/or a DFT-Spread-OFDM (DFT-S-OFDM) demodulator unit, which demodulates reception data modulated in accordance with an OFDM scheme and/or SC-FDMA scheme. In accordance with the uplink channel state estimation result input from the channel estimating unit 105, the reception data demodulator unit 106 performs, on the modulation data input from the radio unit 103, signal processing comprising DFT conversion, subcarrier mapping, IFFT transform and filtering. The reception data demodulator unit 106 thus performs a demodulation process, thereby outputting the demodulation result to the data extractor unit 107.

The data extractor unit 107 verifies the data input from the reception data demodulator unit 106 as to whether the input data is in error or not and outputs the verification result (ACK or NACK) to the scheduling unit 104. The data extractor unit 107 also separates the transport channel and control data in the physical layer from the data input from the reception data demodulator unit 106, and outputs the separated data to the scheduling unit 104. The separated output data comprises CSI, CQI, PMI, and RI transmitted from the mobile station apparatus 200, information indicating ACK/NACK for the downlink transport block, and the scheduling request.

The higher layer 108 performs processes in a packet data convergence protocol (PDCP) layer, a radio link control (RLC) layer, and a radio resource control (RRC) layer. In order to control processors in a lower layer in an integral fashion, the higher layer 108 comprises an interface (not illustrated) between the higher layer 108 and each of the scheduling unit 104, the antenna 109, the radio unit 103, the channel estimating unit 105, the reception data demodulator unit 106, the data control unit 101, the transmission data modulator unit 102 and the data extractor unit 107.

The higher layer 108 manages configuration information in each type of channel notified a signal by the higher layer (such as RRC signaling), and on channel generation, the higher layer 108 notifies the processor (such as the data control unit 101 or the scheduling unit 104) in the lower layer of the configuration information.

The higher layer 108 comprises the radio resource control unit 110 (also referred to a controller). The radio resource control unit 110 manages a variety of configuration information, manages system information, controls paging, manages the communication state of each mobile station apparatus 200, manages the movement of handover, manages the buffer state of each mobile station apparatus 200, manages the connection configuration of unicast and multicast bearers, and manages a mobile station identity (UEID). Also, the higher layer 108 receives information from and transmits information to the base station apparatus 100, and the higher node.

[Configuration of Mobile Station Apparatus 200]

Figure 3:
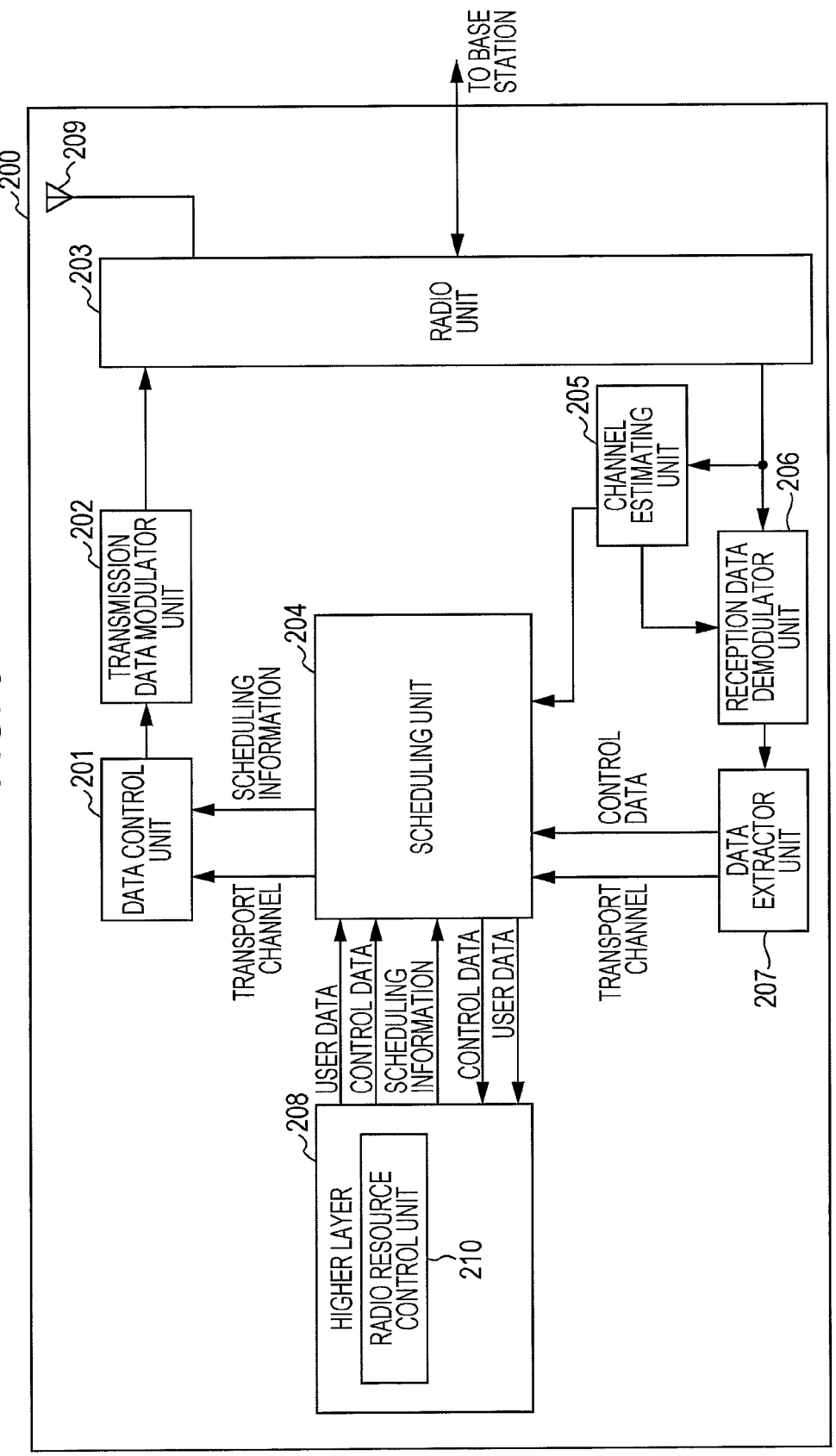
FIG. 3 is a block diagram schematically illustrating a configuration of a mobile station apparatus 200 of the embodiment of the present invention.

FIG. 3 is a block diagram schematically illustrating the configuration of the mobile station apparatus 200 of the embodiment of the present invention. The mobile station apparatus 200 comprises a data control unit 201, a transmission data modulator unit 202, a radio unit 203, a scheduling unit 204, a channel estimating unit 205, a reception data demodulator unit 206, a data extractor unit 207, a higher layer 208 and an antenna 209. The data control unit 201, the transmission data modulator unit 202, the radio unit 203, the scheduling unit 204, the higher layer 208 and the antenna 209 form a transmitter (mobile station transmitter), and the radio unit 203, the scheduling unit 204, the channel estimating unit 205, the reception data demodulator unit 206, the data extractor unit 207, the higher layer 208, and the antenna 209 form a receiver (mobile station receiver).

Processing of the uplink physical layer is performed by the data control unit 201, the transmission data modulator unit 202 and the radio unit 203. Processing of the downlink physical layer is performed by the radio unit 203, the channel estimating unit 205, the reception data demodulator unit 206 and the data extractor unit 207.

The data control unit 201 receives a transport channel from the scheduling unit 204. The data control unit 201 maps the transport channel and a signal and a channel generated in the physical layer to a physical channel in accordance with scheduling information input from the scheduling unit 204. Each piece of data thus mapped is output to the transmission data modulator unit 202.

The transmission data modulator unit 202 modulates transmission data in accordance with the OFDM scheme and/or the SC-FDMA scheme. The transmission data modulator unit 202 performs on data input from the data control unit 201 signal processing comprising data modulation, DFT (discrete Fourier transform) process, subcarrier mapping, IFFT (inverse fast Fourier transform) process, CP insertion, and filtering. The transmission data modulator unit 202 thus generates transmission data and outputs the generated transmission data to the radio unit 203.

The radio unit 203 up-converts modulated data input from the transmission data modulator unit 202 into a signal on a radio frequency, thereby generating a radio signal. The radio unit 203 transmits the radio signal to the base station apparatus 100 via the antenna 209. Also, the radio unit 203 receives via the antenna 209 a radio signal modulated with downlink data from the base station apparatus 100, down-converts the radio signal into a baseband signal, and then outputs resulting received data to the channel estimating unit 205 and the reception data demodulator unit 206.

The scheduling unit 204 performs a process in the medium access control (MAC) layer. The scheduling unit 204 performs mapping on a logical channel and a transport channel, and scheduling (comprising HARQ process, and selection of transport format). In order to control processors in the physical layer, the scheduling unit 204 comprises an interface (not illustrated) between the scheduling unit 204 and each of the antenna 209, the data control unit 201, the transmission data modulator unit 202, the channel estimating unit 205, the reception data demodulator unit 206, the data extractor unit 207 and the radio unit 203.

In accordance with scheduling information from the base station apparatus 100 or the higher layer 208 (transport format and HARQ retransmission information), the scheduling unit 204 generates, during downlink scheduling, scheduling information for use in reception control of the transport channel, a physical signal, and a physical channel, and for use in HARQ retransmission control and downlink scheduling. The scheduling information for use in the downlink scheduling is output to the data control unit 201.

In accordance with the buffer state of the uplink input from the higher layer 208, scheduling information (a transport format, HARQ retransmission information, and the like) of the uplink from the base station apparatus 100 input from the data extractor unit 207, scheduling information input from the higher layer 208 and the like, the scheduling unit 204 generates, during scheduling of the uplink, scheduling information for use in a scheduling process to map the logical channel of the uplink input from the higher layer 208 to the transport channel, and for use in scheduling of the uplink. The transport format of the uplink is derived from information notified by the base station apparatus 100. These pieces of scheduling information are output to the data control unit 201.

The scheduling unit 204 maps the logical channel of the uplink input from the higher layer 208 to the transport channel, and then outputs the resulting mapped data to the data control unit 201. The scheduling unit 204 also outputs, to the data control unit 201, CSI, CQI, PMI, and RI input from the channel estimating unit 205, and verification results of a CRC check input from the data extractor unit 207. Upon processing control data acquired in the downlink and input from the data extractor unit 207 and the transport channel as appropriate, the scheduling unit 204 maps the resulting data to the logical channel of the downlink and then outputs the mapping result to the higher layer 208.

In order to demodulate the downlink data, the channel estimating unit 205 estimates the channel state of the downlink from a demodulation reference signal, and outputs the estimation result to the reception data demodulator unit 206. The channel estimating unit 205 notifies the base station apparatus 100 of estimation results of the channel state of the downlink (radio channel state, CSI, CQI, PMI, and RI). To this end, The channel estimating unit 205 estimates the channel state of the downlink from the downlink reference signal, and then outputs to the scheduling unit 204 the estimation results as CSI, CQI, PMI, and RI.

The reception data demodulator unit 206 demodulates reception data modulated in accordance with the OFDM scheme. In accordance with the channel state estimation results of the downlink input from the channel estimating unit 205, the reception data demodulator unit 206 demodulates modulation data input from the radio unit 203 and outputs the demodulated data to the data extractor unit 207.

The data extractor unit 207 performs a CRC check on data input from the reception data demodulator unit 206 to determine whether the input data is in error or not, and outputs the verification results (information indicating ACK or NACK) to the scheduling unit 204. The data extractor unit 207 separates the transport channel and control data in the physical layer from the data input from the reception data demodulator unit 206, and then outputs the separated data to the scheduling unit 204. The separated control data comprises scheduling information, such as the resource assignment of the downlink or the uplink, and HARQ control information of the uplink.

The higher layer 208 performs processes in a packet data convergence protocol (PDCP) layer, a radio link control (RLC) layer, and a radio resource control (RRC) layer. In order to control processors in the lower layer in an integral fashion, the higher layer 208 comprises an interface (not illustrated) between the higher layer 208 and each of the scheduling unit 204, the antenna 209, the data control unit 201, the transmission data modulator unit 202, the channel estimating unit 205, the reception data demodulator unit 206, the data extractor unit 207 and the radio unit 203.

The higher layer 208 manages configuration information corresponding to each type of channel notified a signal in a higher layer (such as RRC signaling), and on channel generation, the higher layer 208 notifies the processor (such as the data control unit 201 or the scheduling unit 204) in the lower layer of the configuration information.

The higher layer 208 comprises the radio resource control unit 210 (also referred to a controller). The radio resource control unit 210 manages a variety of configuration information, manages system information, controls paging, manages the communication state of the mobile station apparatus 200, manages the movement of handover, manages the buffer state, manages connection configuration of unicast and multicast bearers, and manages a mobile station identity (also referred to UEID).

First Embodiment

A first embodiment of the communication system comprising the base station apparatus 100 and the mobile station apparatus 200 is described below. In the first embodiment, the base station apparatus 100 notifies the mobile station apparatus 200 of the DCI format. The DCI format comprises resource allocation information as to whether to allocate DMRS in localized resource allocation or distributed resource allocation, and information on a frequency offset of the DMRS. The frequency offset of the DMRS is a mobile station apparatus specific parameter (or a UE specific parameter). If distributed resource allocation is enabled based on the resource allocation information transmitted using the DCI format, the mobile station apparatus 200 determines the DMRS resource allocation using the frequency offset of the DMRS. The DCI format comprising information as to the availability of frequency offset hopping for the DMRS may be notified to the mobile station apparatus 200. If the frequency offset hopping for the DMRS is configured to be possible in the DCI format, the mobile station apparatus 200 determines a frequency offset pattern responsive to a slot number, determines the resource allocation for the DMRS in accordance with the frequency offset and the frequency offset hopping pattern, and then transmits the generated DMRS to the base station apparatus 100. The frequency offset hopping pattern is a cell specific parameter (or a base station apparatus specific parameter). Information indicating the availability of the frequency offset hopping for the DMRS may be notified using the RRC signaling.

The frequency offset hopping pattern $n^{cell}_{hop}$ may be determined using a pseudo-random sequence based on a slot number $n_s$. The frequency offset hopping pattern $n^{cell}_{hop}$ is a cell specific parameter (or a base station apparatus specific parameter). For example, the mobile station apparatus 200 may determine the frequency offset hopping pattern $n^{cell}_{hop}$ in accordance with Equation (1).

[Equation 1]

$$n^{cell}_{hop}(n_s) = \begin{cases} 0 & \text{if comb hopping is disabled} \\ \sum_{i=0}^{7} c(8n_s + i) \cdot 2^i & \text{if comb hopping is enabled} \end{cases} \quad (1)$$

In Equation (1), c(i) represents a pseudo-random sequence. The pseudo-random sequence is defined by a 31 sequence length of Gold sequence. An output sequence c(n) (n=0, 1, . . . , $M_{PN}$−1) of a sequence length $M_{PN}$ is defined by Equation (1A).

[Equation 1A]

$$c(n)=(x_1(n+N_C)+x_2(n+N_C))\bmod 2 \quad (1A)$$

In Equation (1A), Nc=1600. A first m sequence $x_1$ is initialized with $x_1(0)=1$, $x_1(n)=0$ (n=1, 2, . . . , 30). An initial value of a second m sequence $x_2(n)$ (n=0, 1, 2, . . . , 30) is defined by Equation (1B).

[Equation 1B]

$$c_{init}=\Sigma_{i=0}^{30}x_2(i)\cdot 2^i \quad (1B)$$

An initial value of $x_2$ is determined by determining an initial value $c_{init}$ of a pseudo-random sequence generator defined by a signal sequence of each physical channel. The mobile station apparatus 200 determines values of $x_1$ and $x_2$ with the value of n being 31 or higher in accordance with Equation (1C).

[Equation 1C]

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad (1C)$$

In this case, the initial value $c_{init}$ being used for the pseudo-random sequence generator used to generate the pseudo-random sequence is determined using a physical layer cell identity $N^{cell}_{ID}$. For example, the mobile station apparatus 200 may determine the initial value $c_{init}$ being used for the pseudo-random sequence generator in accordance with Equation (2). More specifically, if the physical layer cell identity is notified by the base station apparatus 100, the mobile station apparatus 200 may determine the initial value $c_{init}$ being used for the pseudo-random sequence generator on the basis of the physical layer cell identity.

[Equation 2]

$$c_{init} = \left\lfloor \frac{n^{cell}_{ID}}{n^{DMRS}_{PRF}} \right\rfloor \quad (2)$$

Note that the initial value $c_{init}$ being used for the pseudo-random sequence generator may be determined on the basis of a virtual cell identity in a case that the mobile station apparatus 200 is notified of the virtual cell identity. The initial value $c_{init}$ being used for the pseudo-random sequence generator may be determined on the basis of a common identity among coordinated cells in a case that the mobile station apparatus 200 is notified of the common identity. The common identity may be different from a physical cell identity. These identities may be specifically determined in the system. These identities may be notified to the entire cell. These identities may be notified to the mobile station apparatus 200 by the base station apparatus 100 in an individual basis. If the mobile station apparatus 200 is notified of at least one of the identities by the base station apparatus 100, the mobile station apparatus 200 may determine the initial value $c_{init}$ of the pseudo-random sequence generator on the basis of any one of the one or more notified identities.

The mobile station apparatus 200 may further determine a frequency domain starting position $n^{SC}_{offset}$ of subcarrier (resource element) mapping of the DMRS on the basis of a frequency offset $n^{UE}_{offset}$ and a offset hopping pattern $n^{cell}_{hop}$, which the frequency offset $n^{UE}_{offset}$ is a mobile station apparatus specific parameter, and which the offset hopping pattern $n^{cell}_{hop}$ is a cell specific parameter. Also, $n^{SC}_{offset}$ may be a frequency offset of the subcarrier(s) comprising the DMRS in the resource block. For example, the mobile station apparatus 200 determines the frequency offset $n^{SC}_{offset}$ of the subcarrier(s) in accordance with Equation (3).

[Equation (3)]

$$n^{SC}_{offset}=(n^{UE}_{offset}+n^{cell}_{hop}(n_s))\bmod n^{DMRS}_{RRF} \quad (3)$$

Note that the offset hopping pattern $n^{cell}_{hop}$ being a cell specific parameter may be determined on the basis of a pseudo-random sequence comprising a slot number and a physical layer cell identity. For example, the mobile station apparatus 200 may determine the offset hopping pattern $n^{cell}_{hop}$ in accordance with Equation (4).

[Equation 4]

$$n^{cell}_{hop}(n_s, N^{cell}_{ID}) = \begin{cases} 0 & \text{if comb hopping is disabled} \\ \sum_{i=0}^{7} c(8n_s + 8N^{cell}_{ID} + i) \cdot 2^i & \text{if comb hopping is enabled} \end{cases} \quad (4)$$

Figure 4A:
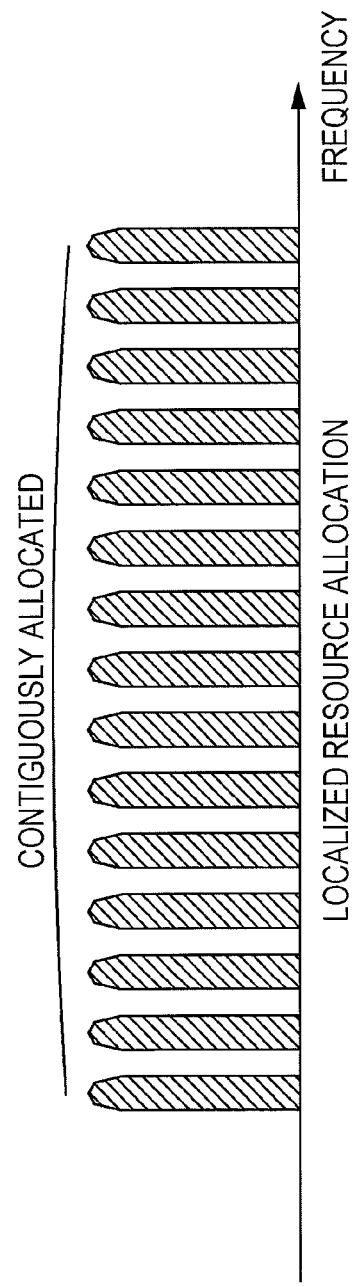
FIG. 4A illustrates a configuration example of DMRS resource allocation of a first embodiment of the present invention.

FIG. 4A and FIG. 4B illustrate configuration examples of DMRS resource allocation of the first embodiment of the present invention. FIG. 4A is a resource allocation chart in a case in which localized resource allocation is enabled based on resource allocation information for the DMRS notified by the base station apparatus 100. The resource allocation remains the same as related art resource allocation. FIG. 4B is a resource allocation chart in a case in which distributed resource allocation is enabled based on resource allocation information for the DMRS notified by the base station apparatus 100 dictates. In a case that the resource allocation with the distributed resource allocation is enabled, subcarriers are allocated at constant intervals (same subcarrier spacing) to keep PAPR low (this allocation may also be referred to as a comb spectrum allocation). The base station apparatus 100 notifies the mobile station apparatus 200 information (repetition factor) that indicates the number of subcarrier intervals (subcarrier spacings) at which DMRS is allocated. The frequency domain starting position of the subcarrier(s) (resource element(s)) mapping of the DMRS is determined by the frequency offset $n^{SC}_{offset}$ calculated in accordance with Equation (3).

FIG. 5 illustrates an example of DMRS distributed resource allocation of the first embodiment of the present invention. One resource block herein comprises 12 subcarriers (resource elements), for example. If the resource allocation is configured to be the distributed resource allocation, the mobile station apparatus 200 may determine one or more subcarriers at which the DMRS is assigned based on the distributed resource allocation, in accordance with a repetition factor $n^{DMRS}_{RPF}$ indicating the number of subcarrier spacings at which the DMRS is assigned, and in accordance with the frequency offset $n^{SC}_{offset}$ indicating the subcarrier at which the resource allocation starts. The repetition factor $n^{DMRS}_{RPF}$ may be specifically determined in the system. The repetition factor $n^{DMRS}_{RPF}$ may be comprised in broadcast information, and then the broadcast information is broadcast from the base station apparatus 100 to a plurality of mobile station apparatuses 200. The repetition factor $n^{DMRS}_{RPF}$ may be notified to the mobile station apparatus 200. In other words, the base station apparatus 100 may configure the repetition factor $n^{DMRS}_{RPF}$ to be specific to the cell. The base station apparatus 100 may also configure the repetition factor $n^{DMRS}_{RPF}$ to be specific to the mobile station apparatus.

Figure 6:
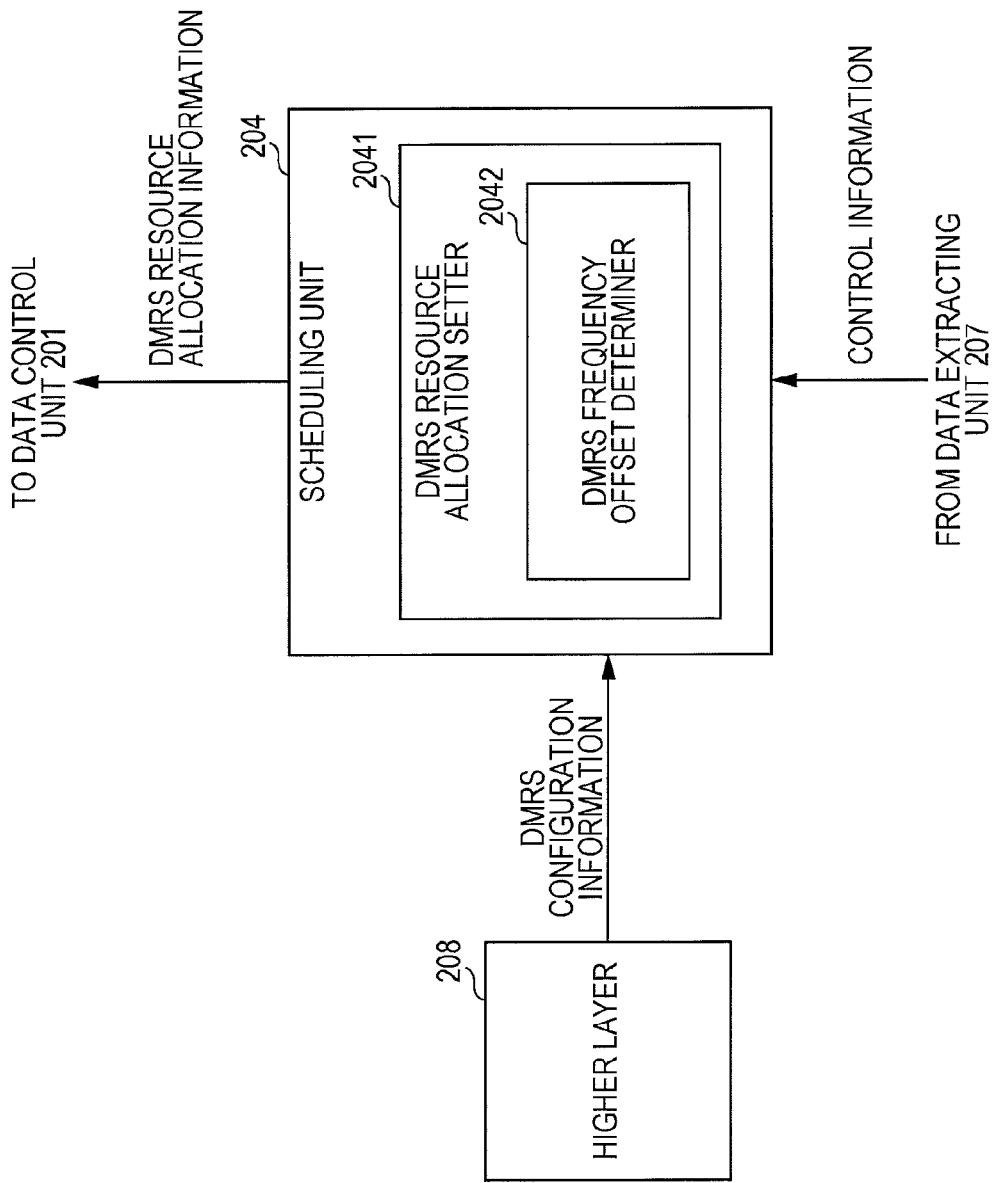
FIG. 6 is a block diagram schematically illustrating a configuration of a scheduling unit 204 of the mobile station apparatus 200 of the first embodiment of the present invention.

FIG. 6 is a block diagram schematically illustrating a configuration of the scheduling unit 204 in the mobile station apparatus 200 of the first embodiment of the present invention. The scheduling unit 204 is notified of DMRS configuration information related to one or more parameters for DMRS by the higher layer 208. The scheduling unit 204 outputs the configuration information to a DMRS resource allocation setter 2041. In response to the input configuration information, the DMRS resource allocation setter 2041 generates transmission data for the DMRS. If control information from the data extractor unit 207 comprises information indicating the distributed resource allocation for the DMRS, a DMRS frequency offset determiner 2042 determines a frequency offset value for the DMRS in distributed resource allocation, and in response to the frequency offset value, the DMRS resource allocation setter 2041 determines the resource allocation for the DMRS. More specifically, the DMRS resource allocation setter 2041 determines the frequency domain starting position of the DMRS subcarrier (resource element) mapping. The scheduling unit 204 outputs the transmission data as part of the scheduling information to the data control unit 201.

The resource allocation information may be 1-bit information. More specifically, the resource allocation information may be only 1-bit information indicating whether the resource allocation information is the localized resource allocation or the distributed resource allocation. The repetition factor may be specifically determined in the system. The repetition factor may be comprised in the broadcast information, and the broadcast information may be broadcast from the base station apparatus 100 to the plurality of mobile station apparatuses 200. The repetition factor may be individually notified from the base station apparatus 100 to the mobile station apparatus 200.

The resource allocation information may be 2-bit information. If the resource allocation information is indicated by the 2-bit information, a DMRS repetition factor index (DMRS RPF index) may be associated with the value of the repetition factor $n^{DMRS}_{RPF}$ as listed in Table 1. More specifically, the 2-bit information and four types of repetition factor values may be associated with each other. If the DMRS repetition factor index is indicated by 3-bit information, the 3-bit information may be associated with eight types of repetition factor values. If $n^{DMRS}_{RPF}=1$, the mobile station apparatus 200 configures the DMRS resource allocation to be the localized resource allocation. More specifically, if $n^{DMRS}_{RPF}=1$, the mobile station apparatus 200 does not perform the distributed resource allocation. The resource allocation information may be information in two bits or more.

TABLE 1

| DMRS RPF index | $n^{DMRS}_{RPF}$ |
|---|---|
| 0 | 1 |
| 1 | 2 |
| 2 | 3 |
| 3 | 4 |

A transmission bandwidth of the DMRS is the same regardless of the localized resource allocation or the distributed resource allocation. If the subcarrier spacing is widened, the number of subcarriers used to transmit the DMRS is reduced accordingly in a case of the same bandwidth. For this reason, the uplink reference signal sequence length changes in response to a change in the number of subcarriers.

FIG. 7 illustrates a configuration example of a control information field comprised in the DCI format. FIG. 7A illustrates the configuration of a DCI format A when the distributed resource allocation is disabled based on the resource allocation information for the DMRS comprised in a UE capability of the mobile station apparatus 200. For example, using RRC signaling, the mobile station apparatus 200 notifies the base station apparatus 100 of information indicating an availability of whether the distributed resource allocation can be performed or not in the resource allocation for the DMRS. For example, the mobile station apparatus 200 notifies the base station apparatus 100 of the information indicating as the UE capability the availability of whether the distributed resource allocation can be performed or not.

For example, the DCI format A is used when the base station apparatus 100 performs the scheduling operation on the PUSCH. More specifically, the DCI format A is used when the mobile station apparatus 200 performs transmission in the PUSCH on one transmit port. The DCI format A is also used when the mobile station apparatus 200 performs transmission in the PUSCH on two transmit ports (the number of transmit ports of two or more is also acceptable).

For example, the information to be transmitted in the DCI format A comprises information used to differentiate the DCI format A from another format (Flag for format differentiation), information to dictate transmission involving hopping (Frequency hopping flag), resource assignment information for the PUSCH (Resource block assignment), information indicating a modulation scheme, a coding rate, and a retransmission parameter (Modulation and Coding Scheme and redundancy version), information to identify whether the transmission data is new data (New data indicator), TPC command information for scheduled PUSCH (TPC command for scheduled PUSCH), information indicating a cyclic shift and an orthogonal cover code (OCC) for a demodulation reference signal (Cyclic shift for DM RS and OCC index), transmission request information of the CSI (CSI request), a padding bit (Padding bit or 0 padding), and transmission request information of SRS that is configured in response to a notification from the RRC signaling (SRS request).

Information fields mapped to these pieces of information are defined in the DCI format A. More specifically, the DCI format A comprises uplink scheduling information. The DCI format A comprises the uplink scheduling information of a given (particular) mobile station apparatus 200. In other words, the DCI format A is arranged in a UE specific search space (USS) or a common search space (CSS).

Figure 7B:
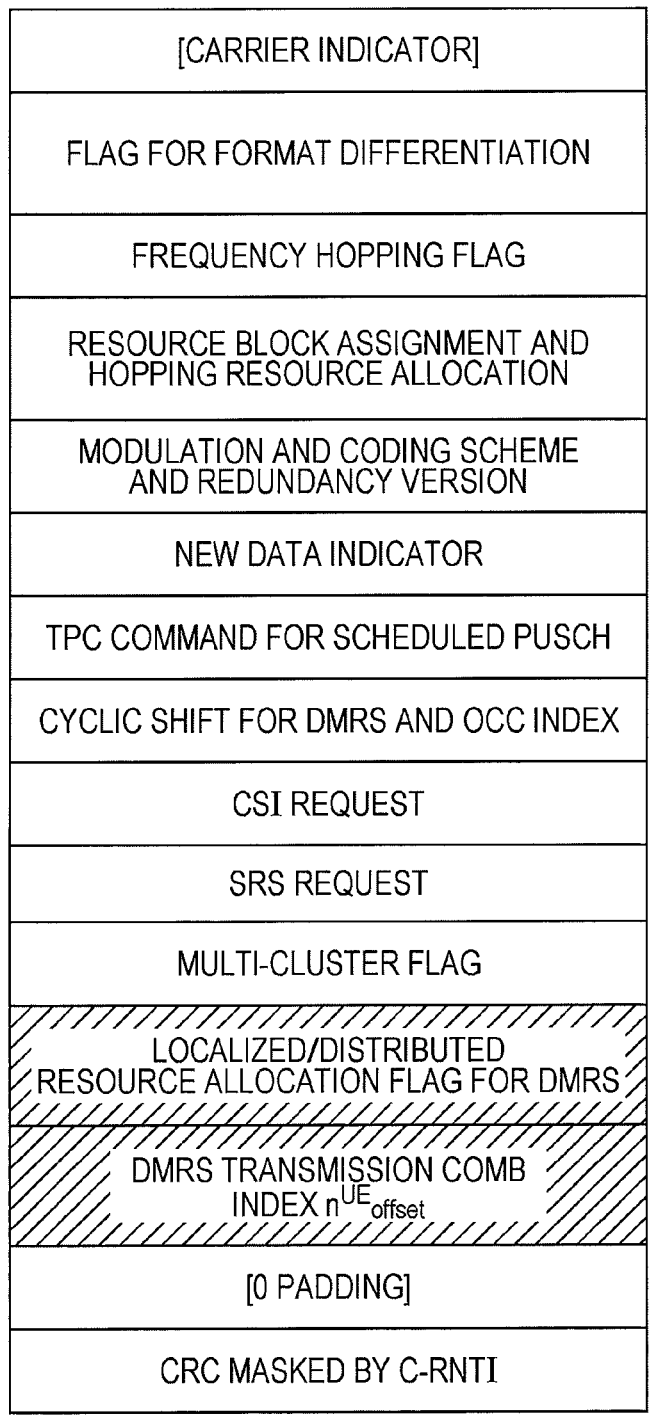
FIG. 7B illustrates a configuration example of the control information field comprised in the DCI format.

FIG. 7B illustrates a DCI format B in a case in which the distributed resource allocation is enabled based on the resource allocation information for the DMRS comprised in the UE capability. Defined in the DCI format B are control information comprised in the DCI format A and information fields that are mapped to a resource allocation flag (Localized/Distributed resource allocation flag for DMRS) to switch the resource allocation for the DMRS (the localized resource allocation/the distributed resource allocation). Also defined in the DCI format B is an information field mapped to a transmission comb index (DMRS transmission comb index) (hatched portion) as a frequency offset specific to the mobile station apparatus 200 of the DMRS. A notification from the higher layer may switch between the DCI format A and the DCI format B in which the information field that maps the resource allocation flag and/or the transmission comb index is newly defined. In response to a signal of the higher layer transmitted from the base station apparatus 100, the mobile station apparatus 200 switches between monitoring (attempting to decode) the DCI format A and monitoring (attempting to decode) the DCI format B comprising the resource allocation flag and/or the transmission comb index.

Figure 7C:
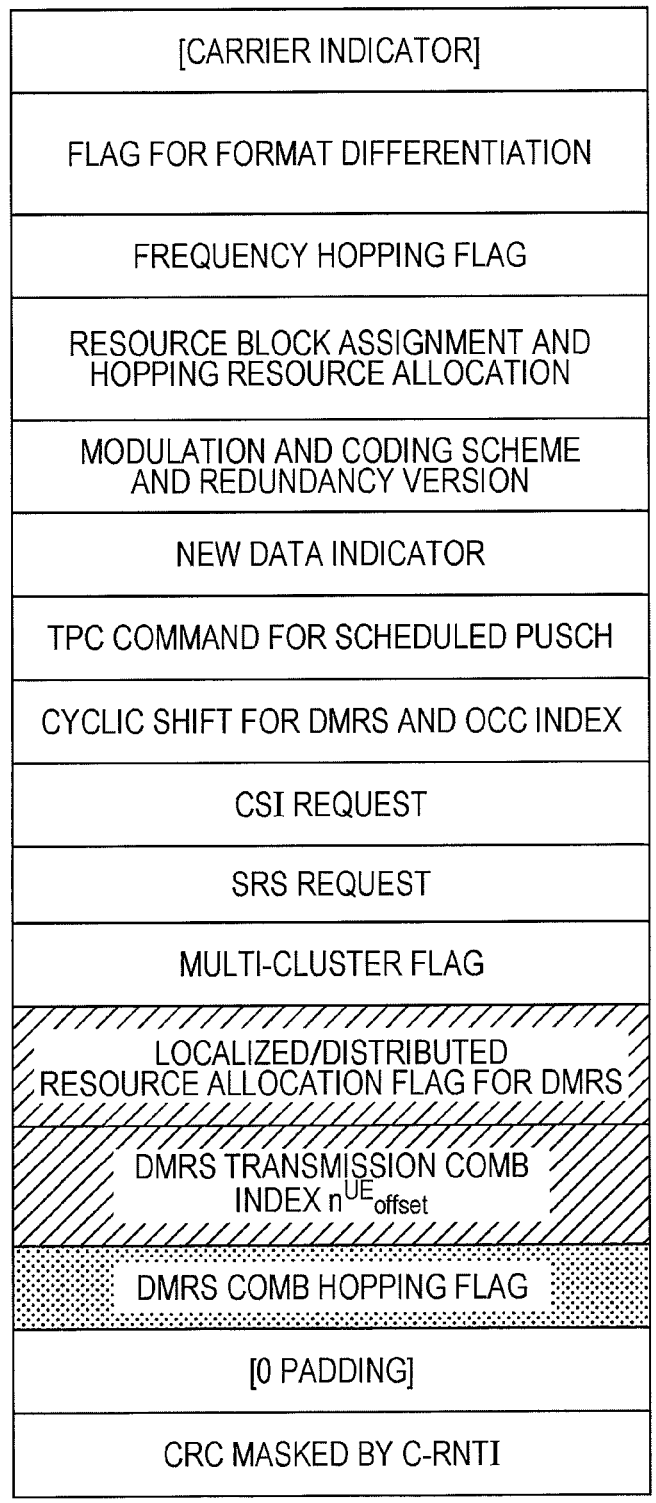
FIG. 7C illustrates a configuration example of the control information field comprised in the DCI format.

More preferably, the control information to be added to the DCI format A comprises information indicating the availability of the frequency offset hopping for the DMRS (DMRS comb hopping flag) (shadowed portion in FIG. 7C). FIG. 7C illustrates the configuration of a DCI format C comprising information of the availability of the frequency offset hopping for the DMRS (DMRS comb hopping flag). Also defined in the DCI format C is, in addition to the control information comprised in the DCI format B, an information field that maps the availability of the frequency offset hopping for the DMRS. Similarly, in response to a signal in the higher layer transmitted from the base station apparatus 100, the mobile station apparatus 200 may switch between monitoring the DCI format A and monitoring (attempting to decode) the DCI format C comprising information indicating the resource allocation flag and/or the transmission comb index and/or the information indicating the availability of the frequency offset hopping.

Figure 8A:
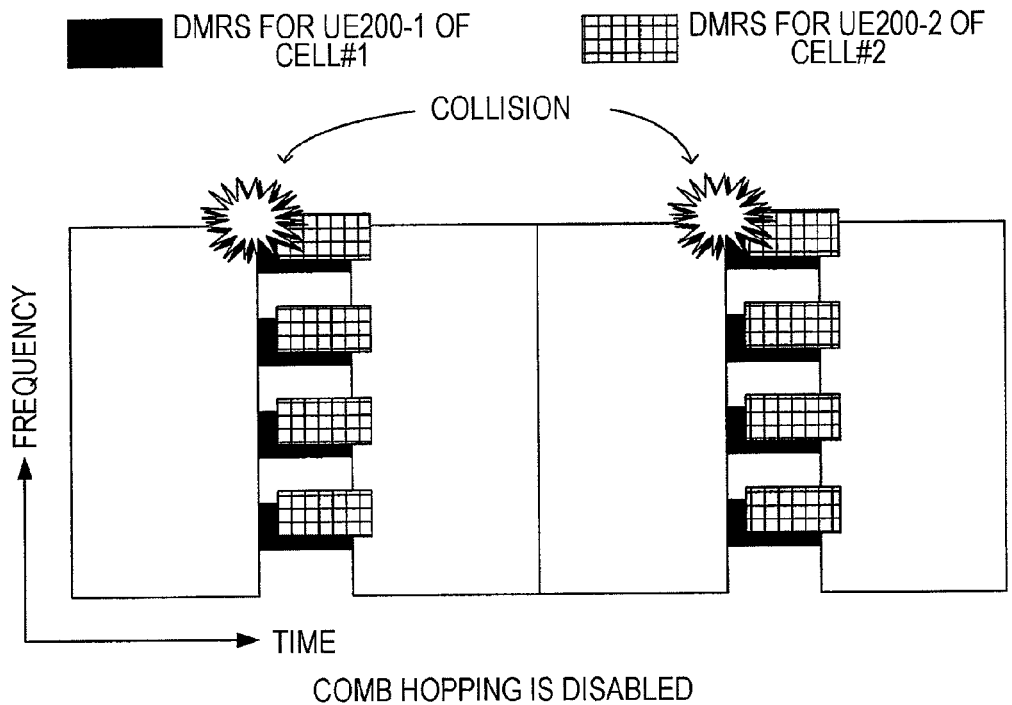
FIG. 8A illustrates an example of frequency offset hopping of the DMRS of the first embodiment of the present invention.
Figure 8B:
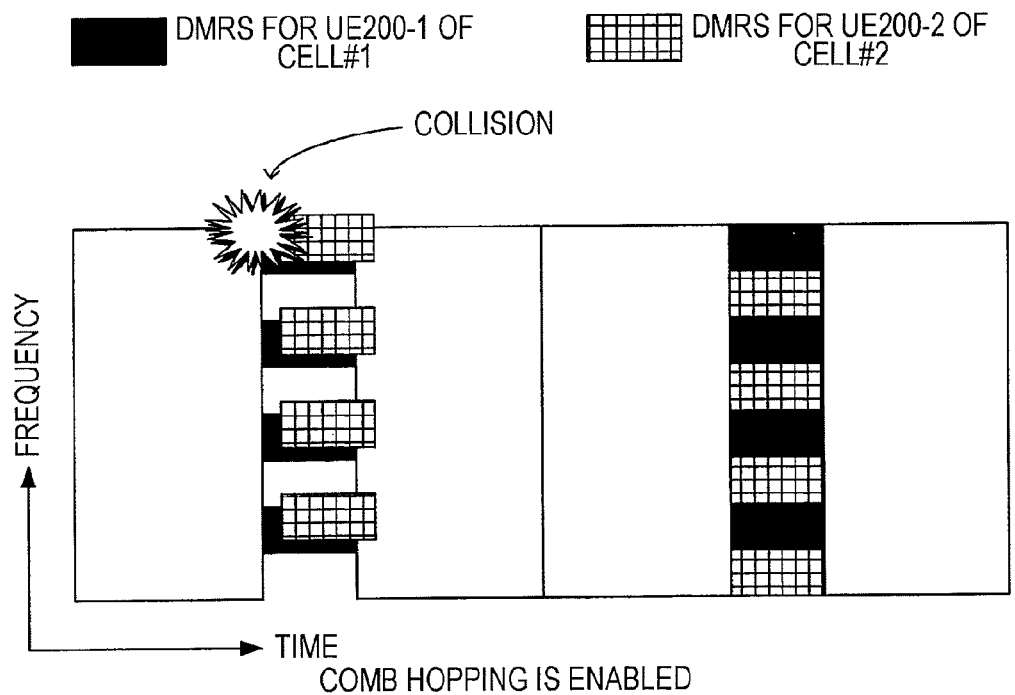
FIG. 8B illustrates an example of the frequency offset hopping of the DMRS of the first embodiment of the present invention.

FIG. 8A and FIG. 8B illustrate examples of frequency offset hopping of DMRS of the first embodiment of the present invention. FIG. 8A illustrates the example where the DMRS radio resources transmitted from a mobile station apparatus 200-1 in a cell #1 (UE200-1 of Cell #1) and a mobile station apparatus 200-2 in a cell #2 (UE200-2 of Cell #2) overlap each other between slots. In this case, since the DMRS transmitted from the mobile station apparatus 200-1 and the DMRS transmitted from the mobile station apparatus 200-2 are allocated to the same resource, interference occurs between the DMRSs. The base station apparatus 100 in the cell #1 may now perform channel estimation based on the DMRS transmitted from the mobile station apparatus 200-1. Since the DMRS transmitted from the mobile station apparatus 200-1 suffers from interference from the DMRS transmitted from the mobile station apparatus 200-2, channel estimation accuracy is substantially degraded. If the DMRS is used in the demodulation process of another signal, communication quality is difficult to ensure. If the hopping of the frequency offset (Comb hopping) is enabled for the mobile station apparatus 200-2 (FIG. 8B), the mobile station apparatus 200-2 and the mobile station apparatus 200-1 transmit the DMRSs with different offsets configured between slots. The mobile station apparatus 200-2 is thus free from overlapping with the radio resource for the DMRS contiguously transmitted by the mobile station apparatus 200-1. Interference between the DMRSs is reduced, and communication quality is maintained.

When the mobile station apparatus 200 performs the PUSCH transmission with the DMRS for the PUSCH on a plurality of transmit ports, the mobile station apparatus 200 allocates the DMRS for the PUSCH to the same carrier on each of the plurality of transmit ports. More specifically, the mobile station apparatus 200 configures the same frequency offset and the same repetition factor on the plurality of transmit ports.

When the mobile station apparatus 200 performs the PUSCH transmission with the DMRS for the PUSCH on a plurality of transmit ports, the mobile station apparatus 200 may allocate the DMRS for the PUSCH to subcarriers different from transmit port to transmit port. More specifically, the mobile station apparatus 200 may configure combinations different in frequency offset and repetition factor from transmit port to transmit port. For example, the DMRS is allocated to a first subcarrier on transmit port #0 and transmit port #1, and the DMRS is allocated to a second subcarrier different from the first subcarrier on transmit port #2 and transmit port #3. In this way, interference among a plurality of DMRSs transmitted using a plurality of transmit ports of the mobile station apparatus 200 is thus reduced.

Second Embodiment

A second embodiment of the communication system comprising the base station apparatus 100 and the mobile station apparatus 200 is described. A general device configuration of the second embodiment remains unchanged from that of the first embodiment, and the discussion thereof is omitted herein. In the second embodiment, the base station apparatus 100 notifies the mobile station apparatus 200 of a DCI format comprising resource allocation information for DMRS, a frequency offset, and a frequency offset shift pattern. The frequency offset and the frequency offset shift pattern are parameters being used for the DMRS distributed allocation, and the frequency offset is the mobile station apparatus specific parameter and the frequency offset shift pattern is the cell specific parameter. If the distributed resource allocation is enabled based on the resource allocation information for the DMRS transmitted using the DCI format, the mobile station apparatus 200 determines the DMRS resource allocation based on the frequency offset, the frequency offset shift pattern, and a slot number. The mobile station apparatus 200 then transmits, to the base station apparatus 100, the DMRS based on the DMRS resource allocation.

The frequency offset $n^{SC}_{offset}$ of the subcarrier(s) in the DMRS distributed resource allocation may be determined in accordance with a frequency offset $n^{UE}_{offset}$ and a frequency offset shift pattern $\Delta^{cell}_{shift}$ ($\Delta^{cell}_{shift}=0, 1, \ldots, n^{DMRS}_{RPF}-1$) and a slot number $n_s$ using Equation (5). The frequency offset $n^{UE}_{offset}$ is a mobile station apparatus parameter (or a UE specific parameter) and the frequency offset shift pattern $\Delta^{cell}_{shift}$ is a cell specific parameter (or a base station apparatus parameter).

[Equation (5)]

$$n^{SC}_{offset}(n_s)=(n_{offset}^{UE}+\Delta_{shift}^{cell} \cdot n_s) \bmod n_{RPF}^{DMRS} \quad (5)$$

The frequency offset shift pattern $\Delta^{cell}_{shift}$ may be notified using the RRC signaling. The frequency offset shift pattern $\Delta^{cell}_{shift}$ does not necessarily have to be notified by the base station apparatus 100. More specifically, the frequency offset shift pattern $\Delta^{cell}_{shift}$ may be determined using a physical layer cell identity. The frequency offset shift pattern $\Delta^{cell}_{shift}$ may be determined using a virtual cell identity in a case that the mobile station apparatus 200 is notified of the virtual cell identity.

The use of the frequency offset shift pattern $\Delta^{cell}_{shift}$ eliminates the need to dynamically notify the availability the frequency offset hopping or the frequency offset shift, and thus the need to add corresponding information bit to the DCI format.

When the mobile station apparatus 200 performs the PUSCH transmission with the DMRS for the PUSCH using a plurality of transmit ports, the mobile station apparatus 200 allocates the DMRS for the PUSCH to the same subcarrier on each of the transmit ports. More specifically, the mobile station apparatus 200 configures the same frequency offset and the same repetition factor for the plurality of transmit ports.

When the mobile station apparatus 200 performs the PUSCH transmission with the DMRS for the PUSCH using a plurality of transmit ports in the same subframe, the mobile station apparatus 200 may allocate the DMRS for the PUSCH to subcarriers different from transmit port to transmit port. More specifically, the mobile station apparatus 200 may configure a combination different in frequency offset and repetition factor from transmit port to transmit port. For example, the mobile station apparatus 200 allocates the DMRS to a first subcarrier on transmit port #0 and transmit port #1, and allocates the DMRS to a second subcarrier different from the first subcarrier on transmit port #2 and transmit port #3. In this way, interference among a plurality of DMRSs transmitted using a plurality of transmit ports of the mobile station apparatus 200 is thus reduced.

Third Embodiment

A third embodiment of the communication system comprising the base station apparatus 100 and the mobile station apparatus 200 is described. A general device configuration of the third embodiment remains unchanged from that of the first embodiment, and the discussion thereof is omitted herein. In the third embodiment, the base station apparatus 100 notifies the mobile station apparatus 200 of a DCI format comprising resource allocation information of DMRS, a frequency offset specific to the mobile station apparatus in DMRS distributed resource allocation, and information indicating a cyclic shift (CS) performed on an uplink demodulation reference signal and an orthogonal cover code (OCC) (Cyclic shift for DM RS and OCC index). If the distributed resource allocation is enabled based on the resource allocation information for the DMRS in accordance with the DCI format, the mobile station apparatus 200 determines a frequency offset hopping pattern for the DMRS distributed resource allocation on each transmit port, using CS and OCC on each transmit port indicated by the information indicating the cyclic shift (CS) performed on the uplink demodulation reference signal and the orthogonal cover code (OCC).

For example, in accordance with Equation (6), the mobile station apparatus 200 determines the frequency offset hopping pattern of the subcarrier on each transmit port using a CS value $n^{(2)}_{DMRS,\lambda}$ and an orthogonal cover code $[w^{(\lambda)}(0), w^{(\lambda)}(1)]$ ([+1, +1] or [+1, −1]) indicated by the information of the CS for DMRS and the OCC comprised in the DCI format.

[Equation 6]

$$n_{offset,\lambda}^{SC}(n_s)=n_{offset}^{UE}+w^{(\lambda)}(n_s \bmod 2) \cdot n_{DMRS,\lambda}^{(2)}) \bmod n_{RPF} \quad (6)$$

In accordance with the third embodiment, the frequency offset hopping pattern is determined on each transmit port from the CS for the DMRS and the OCC notified by the DCI format. This eliminates the need to notify the frequency offset hopping pattern on each transmit port, and an amount of information that the base station apparatus 100 notifies to the mobile station apparatus 200 is not increased.

More specifically, the mobile station apparatus 200 generates a DMRS signal sequence (demodulation reference signal sequence) on the basis of the information on the CS for the DMRS and the OCC that the base station apparatus 100 notifies using the DCI format, and transmits the generated DMRS signal sequence based on the frequency offset hopping pattern determined on the basis of the information indicating the CS for the DMRS and the OCC.

The frequency offset hopping pattern for the DMRS distributed resource allocation on each transmit port may be associated with a CS value $n_{cs,\lambda}$ of the DMRS. For example, the frequency offset hopping pattern for the DMRS distributed resource allocation may be determined in accordance with Equation (7).

[Equation (7)]

$$n_{offset,\lambda}^{SC}(n_s)(n_{offset}^{UE}+n_{CS,\lambda}) \bmod n_{RPF}^{DMRS} \quad (7)$$

The CS value $n_{cs,\lambda}$ of the DMRS is determined in accordance with Equation (8).

[Equation (8)]

$$n_{cs,\lambda}(n_{DMRS}^{(1)} + n_{DMRS,\lambda}^{(2)} + n_{PN}(n_s)) \bmod 12 \quad (8)$$

Here, $n^{(1)}_{DMRS}$ is a CS value of the DMRS associated with the cyclic shift notified using the RRC signaling. $n_{PN}(n_s)$ is a value that is determined from a pseudo-random sequence in accordance with Equation (9).

[Equation (9)]

$$n_{PN}(n_s) = \Sigma_{i=0}^{7} c(8 N_{symb}^{UL} \cdot n_s + i) \cdot 2^i \quad (9)$$

The pseudo-random sequence generator is initialized with an initial value $c_{init}$ at the beginning of each radio frame, where the initial value $c_{init}$ is in accordance with Equation (10).

[Equation (10)]

$$c_{init} = \left\lfloor \frac{N_{ID}^{cell}}{30} \right\rfloor \cdot 2^5 + f_{ss}^{PUSCH} \quad (10)$$

Here, $f^{PUSCH}_{ss}$ is a sequence shift pattern for the PUSCH and the mobile station apparatus 200 determines $f^{PUSCH}_{ss}$ in accordance with Equation (11).

[Equation (11)]

$$f_{ss}^{PUSCH} = (f_{ss}^{PUCCH} + \Delta_{ss}) \bmod 30 \quad (11)$$

$\Delta_{ss} \in \{0, 1, \ldots, 29\}$ $\Delta_{ss}$ represents a parameter, the configuration of which is notified using the RRC signaling. $f^{PUCCH}_{ss}$ is a sequence shift pattern for the PUCCH and the mobile station apparatus 200 determines $f^{PUCCH}_{ss}$ in accordance with Equation (12).

[Equation 12]

$$f_{ss}^{PUCCH} = N_{ID}^{cell} \bmod 30 \quad (12)$$

Using this method, the frequency offset pattern is thus determined in accordance with a smaller amount of information.

More specifically, the base station apparatus 100 notifies the mobile station apparatus 200 of a primary synchronization signal, a secondary synchronization signal and a DCI format. The mobile station apparatus 200 determines a physical layer cell identity from the primary synchronization signal and the secondary synchronization signal, generates a DMRS signal sequence from the physical layer cell identity and information indicating CS for a DMRS and OCC transmitted using the DCI format, and transmits the DMRS signal sequence generated using a frequency offset hopping pattern on each transmit port determined in accordance with the information indicating the CS for the DMRS and OCC.

If a connection is established between the base station apparatus 100 and the mobile station apparatus 200, and carrier aggregation to be performed using multiple carriers is possible, the mobile station apparatus 200 configures, using the RRC signaling, a physical layer cell identity for a carrier, the transmission of which is dictated by the base station apparatus 100. The mobile station apparatus 200 generates the DMRS signal sequence based on the physical layer cell identity notified using the RRC signaling and the information indicating the CS and OCC, and then transmits a DMRS signal sequence that has been generated in accordance with a frequency offset hopping pattern on each transmit port determined on the basis of the information indicating the CS for the DMRS and OCC.

The above-described embodiment is applicable to an integrated circuit/chip set mounted on the base station apparatus 100 and the mobile station apparatus 200. In the above-described embodiments, a program to implement the functions of the base station apparatus 100 and the functions of the mobile station apparatus 200 may be recorded on a computer-readable recording medium. A computer system may then read the program recorded on the recording medium, and execute the program to perform a control process of the base station apparatus 100 and the mobile station apparatus 200. The term "computer system" comprises OS and hardware such as peripheral device.

The term "computer readable recording medium" refers to a portable medium, such as a flexible disk, a magneto-optical disk, ROM, or CD-ROM, or a recording device, such as a hard disk, built into the computer system. The "computer readable recording medium" may comprise a communication line that holds dynamically the program for a short period of time. The communication line transmits the program via a communication channel such as a network like the Internet or a communication line such as a telephone line. The "computer readable recording medium" may also comprise a volatile memory in the computer system that may be a server or a client and stores the program for a predetermined period of time. The program may implement part of the above-described function. The part of the above-described function may be used in combination with a program previously recorded on the computer system.

The embodiments of the present invention have been described in detail with reference to the drawings. The specific configuration of the embodiments is not limited to the configuration described above. A variety of designs is incorporated without departing from the scope of the present invention.

The present invention appropriately finds applications in the base station apparatus 100, the mobile station apparatus 200, the communication system and the communication method.

REFERENCE SIGNS LIST

100 Base station apparatus
101 Data control unit
102 Transmission data modulator unit
103 Wireless unit
104 Scheduling unit
105 Channel estimating unit
106 Reception data demodulator unit
107 Data extractor unit
108 Higher layer
109 Antenna
110 Radio resource control unit
200, 200-1, and 200-2 Mobile station apparatuses
201 Data control unit
202 Transmission data modulator unit
203 Radio unit
204 Scheduling unit
205 Channel estimating unit
206 Reception data demodulator unit
207 Data extractor unit
208 Higher layer
209 Antenna
210 Radio resource control unit

The invention claimed is:

1. A terminal device comprising:
a transmitter configured to transmit a demodulation reference signal associated with a physical channel; and
a receiver configured to receive a configuration of comb of the demodulation reference signal;
wherein the demodulation reference signal is mapped based on the configuration of comb,
the demodulation reference signal is defined based on an orthogonal sequence and a cyclic shift,
a pattern of the orthogonal sequence and the cyclic shift is expanded in a case that the terminal device is configured with the comb of the demodulation reference signal,
the receiver is configured to receive a downlink control information format, and
a pattern of the comb, the cyclic shift, and the orthogonal sequence for each antenna port are determined based on a cyclic shift field in the downlink control information format in the case that the terminal device is configured with the comb of the demodulation reference signal.

2. A base station device comprising:
a transmitter configured to transmit a configuration of comb of a demodulation reference signal related to a physical channel and a configuration of an orthogonal sequence,
wherein the configuration of an orthogonal sequence is expanded based on the configuration of the comb and a cyclic shift,
the transmitter is configured to transmit a downlink control information format, and
a pattern of the comb, the cyclic shift, and the orthogonal sequence for each antenna port are determined based on a cyclic shift field in the downlink control information format.

3. A transmitting method in a terminal device comprising:
transmitting a demodulation reference signal associated with a physical channel; and
receiving a configuration of comb of the demodulation reference signal; and
receiving a downlink control information format,
wherein the demodulation reference signal is mapped based on the configuration of comb,
the demodulation reference signal is defined based on an orthogonal sequence and a cyclic shift,
a pattern of the orthogonal sequence and the cyclic shift is expanded in a case that the terminal device is configured with the comb of the demodulation reference signal, and
a pattern of the comb, the cyclic shift, and the orthogonal sequence for each antenna port are determined based on a cyclic shift field in the downlink control information format in the case that the terminal device is configured with the comb of the demodulation reference signal.

* * * * *